United States Patent
Sowa et al.

(10) Patent No.: US 7,679,798 B2
(45) Date of Patent: Mar. 16, 2010

(54) OPTICAL SCANNING DEVICE AND COVER GLASS CLEANING MECHANISM FOR OPTICAL SCANNING DEVICE

(75) Inventors: Takeshi Sowa, Nagano-ken (JP); Nozomu Inoue, Nagano-ken (JP); Yoichi Mitsui, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 65 days.

(21) Appl. No.: 11/955,842

(22) Filed: Dec. 13, 2007

(65) Prior Publication Data

US 2009/0009867 A1 Jan. 8, 2009

Related U.S. Application Data

(62) Division of application No. 10/498,240, filed as application No. PCT/JP03/05694 on May 7, 2003, now Pat. No. 7,330,295.

(30) Foreign Application Priority Data

| May 9, 2002 | (JP) | 2002-133737 |
| Jul. 11, 2002 | (JP) | 2002-202206 |
| Jul. 19, 2002 | (JP) | 2002-211349 |

(51) Int. Cl.
*G02B 26/08* (2006.01)
*G03G 15/20* (2006.01)

(52) U.S. Cl. .................. 359/196.1; 399/123

(58) Field of Classification Search ............. None
See application file for complete search history.

(56) References Cited

U.S. PATENT DOCUMENTS

| 4,509,819 A | 4/1985 | Sherman et al. |
| 4,796,965 A | 1/1989 | Ishikawa |
| 4,885,640 A * | 12/1989 | Yoshiura .................. 358/400 |
| 5,376,994 A * | 12/1994 | Mama et al. ................ 399/93 |

(Continued)

FOREIGN PATENT DOCUMENTS

EP 138400 A1 4/1985

(Continued)

*Primary Examiner*—James Phan
(74) *Attorney, Agent, or Firm*—Sughrue Mion, PLLC

(57) ABSTRACT

The present invention relates to an optical scanning device in which a light beam is incident twice on a deflective reflecting facet and its object is to reduce curvature in scanning line trail or make the curvature substantially zero, or correct scanning line displacement due to the curvature in scanning line trail. Two stationary plane mirrors (13, 14) are disposed to face a deflective reflecting facet (11) which can be rotated about its rotational axis (12) such that a light beam (a1) being incident on and reflected from the deflective reflecting facet (11) is reflected by the two stationary plane mirrors (13, 14) sequentially. The reflected light beam (a3) is incident on and reflected by the deflective reflecting facet (11) again. Assuming that a plane being parallel to the rotational axis (12) and including the light beam (a0) which is first incident on the deflective reflecting facet is an incident plane, the central ray of an emergent light beam (a4) when the emergent light beam (a4) after the second reflection by the deflective reflecting facet (11) is on the incident plane and a straight line as the central ray of a light beam being projected on the incident plane when the deflective reflecting facet (11) is revolved by the maximum rotational angle are set substantially parallel to each other.

3 Claims, 27 Drawing Sheets

U.S. PATENT DOCUMENTS

| | | |
|---|---|---|
| 6,337,956 B1 * | 1/2002 | Sato et al. .................... 399/27 |
| 6,445,483 B2 | 9/2002 | Takada et al. |
| 6,621,610 B2 | 9/2003 | Sowa et al. |
| 2002/0167709 A1 | 11/2002 | Sowa et al. |

FOREIGN PATENT DOCUMENTS

| | | | |
|---|---|---|---|
| EP | 0454503 | A2 | 10/1991 |
| EP | 816894 | A2 | 1/1998 |
| EP | 1248136 | A2 | 10/2002 |
| JP | 51-006563 | | 1/1976 |
| JP | 51-6563 | A | 1/1976 |
| JP | 61-7818 | A | 1/1986 |
| JP | 63-29166 | U | 2/1988 |
| JP | 1-206000 | A | 8/1989 |
| JP | 1-155066 | U | 10/1989 |
| JP | 09-076554 | A | 3/1997 |
| JP | 9-80875 | A | 3/1997 |
| JP | 10-020235 | A | 1/1998 |
| JP | 2002-267983 | A | 9/2002 |
| JP | 2002-365582 | A | 12/2002 |

* cited by examiner

OPTICAL SCANNING DEVICE AND COVER GLASS CLEANING MECHANISM FOR OPTICAL SCANNING DEVICE

CROSS-REFERENCE TO RELATED APPLICATIONS

This is a Divisional Application of U.S. application Ser. No. 10/498,240 filed Jun. 10, 2004, now U.S. Pat. No. 7,330,295, which is a National Stage Application filed under §371 of PCT Application No. PCT/JP03/05694 filed May 7, 2003; the entire disclosure of the prior application is considered part of the disclosure of the accompanying Divisional Application and are hereby incorporated by reference.

TECHNICAL FIELD

The present invention relates to an optical scanning device to be used for exposure for writing image of an image forming apparatus such as a laser beam printer and, more particularly, to an optical scanning device in which an optical beam is sequentially incident twice on deflective reflecting facet(s) of a rotating polygonal mirror or the like.

The present invention relates to a mechanism for cleaning a cover glass of an optical scanning device which is capable of securely removing dust adhering to the surface of the cover glass.

BACKGROUND ART

Conventionally, an optical device comprising a deflective reflecting facet and two stationary plane mirrors has been proposed in Japanese Unexamined Patent Publication No. S51-6563. The two stationary plane mirrors are disposed to face the deflective reflecting facet which can be rotated or swivelled about its rotational axis. An incident light beam deflected by the deflective reflecting facet is reflected by the two stationary plane mirrors sequentially, and is incident on the deflective reflecting facet again, thereby correcting displacement in exit direction of deflected optical beam due to misalignment of the rotational axis of the deflective reflecting facet or misalignment of each deflective reflecting facet itself.

Further, a light deflective optical system comprising a deflective reflecting facet and two stationary plane mirrors has been proposed in Japanese Unexamined Patent Publication No. S61-7818 (U.S. Pat. No. 4,796,965). The two stationary plane mirrors are disposed to face the deflective reflecting facet which can be revolved or swivelled about its rotational axis and the two stationary plane mirrors are arranged such that the edge lines of the two mirrors are on a plane perpendicular to said rotational axis of the deflective reflecting facet. An incident light beam is incident on the deflective reflecting facet through a space between the two stationary plane mirrors. The deflected light beam reflected by the deflective reflecting facet is reflected by the two stationary plane mirrors sequentially and is incident on the deflective reflecting facet again so that the deflected light beam reflected is projected to pass through a space between the deflective reflecting facet and the two stationary plane mirrors or between the two stationary plane mirrors, thereby correcting scanning line distortion.

However, since no analytical study has been made and no reference about incident angle of 20° or less has been made in the Japanese Unexamined Patent Publication No. S61-7818, the light deflective optical system cannot properly correct scanning line distortion.

In the optical system in which light beam deflected twice by the same deflective reflecting facet, the trail of the light beam may be curved after the second time deflecting reflection depending on the incident angle of the light beam. Therefore, depending on position of the optical axis direction of an optical member such as a lens of the scanning optical system after deflection, a wider effective range in the sub-scanning direction (perpendicular to the scanning direction) is required. However, it is hard to manufacture an anamorphic lens, to be used in a scanning optical system, having a wide effective range both in the scanning direction and the sub scanning direction. This causes another problem that the degree of freedom of arrangement among a plurality of lenses is reduced.

The narrower the required effective range of optical member such as a lens is, the higher the accuracy of an optical face is easily obtained.

In any event, it is very advantageous if the curvature in scanning line trail is restrained to very small at any position in the optical direction.

By the way, in an optical scanning device like the optical scanning device proposed in Japanese Unexamined Patent Publication No. S51-6563 in which an incident light beam is reflected by even number stationary plane mirrors sequentially so that the light beam is incident twice on the same deflective reflecting facet to deflect the light beam, there is no necessary to provide an optical system for correcting the surface tilt error in the deflective reflecting facet from a viewpoint of compensation of scanning line displacement.

However, the scanning angle must be small because the light beam interferes with the stationary plane mirrors when the light beam is incident on and projected to the deflective reflecting facet at a right angle to the sub-scanning direction. Therefore, the incident or exit angle is required to be an angle not the right angle to the deflective reflecting facet. This may make a difference in exit angle that causes the curvature of scanning line trail.

In addition, a scanning line displacement on an imaging surface may be caused. The amount of the scanning line displacement is a product obtained by multiplying the displacement at the second deflection due to the surface tilt error by a transversal enlargement ratio $\beta$ of the sub-scanning direction of the scanning optical system.

In case that the value of surface tilt error varies at the beam incident position depending on the rotation of the deflective reflecting facet because the deflective reflecting facet has a twisted or curved portion, there must be differences in exit angle as compared to a case that the deflective reflecting facet has a complete plane, thus causing further curvature in the scanning line trail. In case that the twisting or curving degrees of deflective reflecting facets differ from each other, the exit angles vary every deflective reflecting facet, thus causing scanning line distortion on the imaging surface.

DISCLOSURE OF THE INVENTION

The present invention was made to overcome the aforementioned problems of conventional techniques. The first object of the present invention is, in an optical scanning device in which a light beam is incident twice on a deflective reflecting facet, to reduce curvature in scanning line trail or make the curvature in scanning line trail to be substantially zero at a certain position, thereby easing the limitation on arrangement of lenses in the scanning optical system in the optical direction.

The second object of the present invention is to provide an optical scanning device in which an incident light beam is reflected by even number stationary plane mirrors sequentially so that the light beam is incident twice on the same deflective reflecting facet to deflect the light beam and which is characterized in that no curvature in scanning line based on curvature in scanning line trail caused by difference in exit angle is created so that the scanning line displacement due to surface tilt error or variation in exit angle is corrected.

The third object of the present invention is to provide a cover glass cleaning mechanism for an optical scanning device which is structured such that dust and dirt adhering to the surface of a cover glass can be securely removed.

A first optical scanning device of the present invention achieving the first object mentioned above is an optical scanning device comprising a light deflective optical system in which two stationary plane mirrors are disposed to face a deflective reflecting facet which is parallel to a rotational axis and can be rotated or swivelled about the rotational axis such that a light beam being incident on and reflected from said deflective reflecting facet is reflected by said two stationary plane mirrors sequentially and is incident on and reflected by the deflective reflecting facet again, wherein assuming that a plane being parallel to said rotational axis and including the light beam to be first incident on said deflective reflecting facet is an incident plane, said two stationary plane mirrors are disposed perpendicular to said incident plane, and the central ray of an emergent light beam when the emergent light beam after the second reflection by said deflective reflecting facet is on said incident plane and a straight line as the central ray of an emergent light beam being projected on the incident plane when the deflective reflecting facet is revolved by the maximum rotational angle are set substantially parallel to each other.

In this case, the optical scanning device may be structured such that the light beam to be first incident on the deflective reflecting facet passes through a space between the two stationary plane mirrors and the deflected light beam after the second reflection by the deflective reflecting facet passes through the space between the two stationary plane mirrors and may be structured such that the one of the two stationary plane mirrors is positioned to be sandwiched between the light beam first incident on the deflective reflecting facet and the emergent light beam after the second reflection by the deflective reflecting facet.

Further, the optical scanning device is preferably structured to satisfy the following relation:

$$0.33 \cdot \theta 1 \leq \theta 2 \leq 0.37 \cdot \theta 1 \quad (21)$$

where $\theta 1$ is the incident angle of the central ray of the light beam to be first incident on the deflective reflecting facet at a position where the deflective reflecting facet is perpendicular to the incident plane and $\theta 2$ is the exit angle of the central ray of the emergent light beam after the second reflection by the deflective reflecting facet.

A second optical scanning device of the present invention is an optical scanning device comprising a light deflective optical system in which two stationary plane mirrors are disposed to face a deflective reflecting facet which is parallel to a rotational axis and can be rotated or swivelled about the rotational axis such that a light beam being incident on and reflected from said deflective reflecting facet is reflected by said two stationary plane mirrors sequentially and is incident on and reflected by the deflective reflecting facet again, wherein assuming that a plane being parallel to said rotational axis and including the light beam to be first incident on said deflective reflecting facet is an incident plane, said two stationary plane mirrors are disposed perpendicular to said incident plane, and said optical scanning device is structured to satisfy the following relation:

$$0.33 \cdot \theta 1 - 1.27 \leq \theta 2 \leq 0.35 \cdot \theta 1 - 1.50 \quad (22)$$

where $\theta 1$ is the incident angle of the central ray of the light beam to be first incident on said deflective reflecting facet at a position where said deflective reflecting facet is perpendicular to the said incident plane and $\theta 2$ is the exit angle of the central ray of the emergent light beam after the second reflection by said deflective reflecting facet.

Also in this case, the optical scanning device may be structured such that the light beam to be first incident on the deflective reflecting facet passes through a space between the two stationary plane mirrors and the deflected light beam after the second reflection by the deflective reflecting facet passes through the space between the two stationary plane mirrors and may be structured such that the one of the two stationary plane mirrors is positioned to be sandwiched between the light beam first incident on the deflective reflecting facet and the emergent light beam after the second reflection by the deflective reflecting facet.

A third optical scanning device of the present invention is an optical scanning device comprising a light deflective optical system in which two stationary plane mirrors are disposed to face a deflective reflecting facet which is parallel to a rotational axis and can be rotated or swivelled about the rotational axis such that a light beam being incident on and reflected from said deflective reflecting facet is reflected by said two stationary plane mirrors sequentially and is incident on and reflected by the deflective reflecting facet again, wherein assuming that a plane being parallel to said rotational axis and including the light beam to be first incident on said deflective reflecting facet is an incident plane, said two stationary plane mirrors are disposed perpendicular to said incident plane, and the central ray of an emergent light beam when the emergent light beam after the second reflection by said deflective reflecting facet is on said incident plane and a straight line as the central ray of an emergent light beam being projected on the incident plane when the deflective reflecting facet is revolved by the maximum rotational angle intersect with each other at a position near at least one of optical surfaces disposed in the optical axial direction of a scanning optical system between said deflective reflecting facet and an imaging surface.

Also in this case, the optical scanning device may be structured such that the light beam to be first incident on the deflective reflecting facet passes through a space between the two stationary plane mirrors and the deflected light beam after the second reflection by the deflective reflecting facet passes through the space between the two stationary plane mirrors and may be structured such that the one of the two stationary plane mirrors is positioned to be sandwiched between the light beam first incident on the deflective reflecting facet and the emergent light beam after the second reflection by the deflective reflecting facet.

A fourth optical scanning device of the present invention achieving the second object mentioned above is an optical scanning device comprising: a light deflective optical system in which two stationary plane mirrors are disposed to face a deflective reflecting facet which is parallel to a rotational axis and can be rotated or swivelled about the rotational axis such that a light beam being incident on and reflected from said deflective reflecting facet is reflected by said two stationary plane mirrors sequentially and is incident on and reflected by the deflective reflecting facet again; an illumination optical system which irradiates a light beam to said deflective reflecting facet; and a scanning optical system which projects the light beam deflected by said light deflective optical system to an imaging surface to form a scanning line, wherein assuming that a plane being parallel to said rotational axis and including the light beam to be first incident on said deflective reflecting facet is an incident plane, said two stationary plane mirrors are disposed perpendicular to said incident plane, and an emergent light beam when the emergent light beam after the second reflection by said deflective reflecting facet is on said incident plane has such a relation that the second reflection point and said imaging surface are substantially conjugated to each other on the incident plane.

In this case, the optical scanning device is preferably structured such that the light beam to be first incident on the deflective reflecting facet passes through a space between the two stationary plane mirrors and the deflected light beam after the second reflection by the deflective reflecting facet passes through the space between the two stationary plane mirrors.

It is also preferable that, when the emergent light beam after the second reflection by the deflective reflecting facet is on the incident plane, the light beam irradiated from the illumination optical system converges near the second reflection point on the incident plane.

Further, it is preferable that the following relation is satisfied:

$$|\beta \cdot Ld \cdot \tan(2\epsilon)/\cos(2\epsilon)| \leq 0.25 \cdot LP \qquad (30)$$

or the following relation is satisfied:

$$|\beta \cdot Ld \cdot \tan(2\epsilon)/\cos(2\epsilon)| \leq 0.125 \cdot LP \qquad (31)$$

where Ld is the transfer distance from the first deflection point to the second deflection point when the emergent light beam after the second reflection by the deflective reflecting facet is on the incident plane, $\epsilon$ is the angle of a surface tilt error in the deflective reflecting facet, $\beta$ is the transverse magnification in the direction of the incident plane of the scanning optical system, and LP is a scanning pitch in the imaging surface.

For example, the optical scanning device of the present invention as mentioned above is preferably employed for exposure for writing image in an image forming apparatus.

According to the first through third optical scanning devices of the present invention, an optical scanning device employing a light deflective optical system of twice incidence type comprising a deflective reflecting facet and two stationary plane mirrors is characterized in that the central ray of an emergent light beam when the emergent light beam after the second reflection by the deflective reflecting facet is on the incident plane and a straight line as the central ray of an emergent light beam being projected on the incident plane when the deflective reflecting facet is revolved by the maximum rotational angle are set substantially parallel to each other, the equation (22) is satisfied, or the central ray of an emergent light beam when the emergent light beam after the second reflection by the deflective reflecting facet is on the incident plane and a straight line as the central ray of an emergent light beam being projected on the incident plane when the deflective reflecting facet is revolved by the maximum rotational angle intersect with each other at a position near at least one of optical surfaces disposed in the optical axial direction of a scanning optical system. Therefore, curvature in scanning line trail on the optical surface(s) in the scanning optical system is reduced or becomes substantially zero, thereby increasing the degree of freedom of position arrangement of the scanning optical system and allowing the reduction in dimension in the sub scanning direction of a scanning optical system, thus achieving an inexpensive scanning optical device which is small and has high accuracy.

According to the fourth optical scanning device of the present invention, an optical scanning device employing a light deflective optical system of twice incidence type comprising a deflective reflecting facet and two stationary plane mirrors is characterized in that an emergent light beam when the emergent light beam after the second reflection by said deflective reflecting facet is on the incident plane has such a relation that the second reflection point and the imaging surface are substantially conjugated to each other on the incident plane, whereby the position in the sub scanning direction of the emergent light beam converging on the imaging surface does not move even with variation of rotational angle of the deflective reflecting facet. Therefore, even when the scanning line trail is curved due to the difference in exit angle, no curvature in scanning line is caused so as to create a substantially straight scanning line on the imaging surface.

A cover glass cleaning mechanism for an optical scanning device of the present invention is a cover glass cleaning mechanism comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein said cover glass is disposed to project on a mounting member, and the stroke length of said cleaning lever is set such that said cleaning member can be moved to a position out of the end of the cover glass on at least one of ends in the operational direction of said cleaning lever.

The present invention is also characterized in that the stroke length of said cleaning lever is set to be longer than the length in the longitudinal direction of said cover glass.

The present invention also provides a cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein a guide member is provided on said cover glass so that said cleaning lever is reciprocated along said guide member and parallel to said cover glass.

The present invention is characterized in that said guide member is arranged to extend over the entire length of said cover glass.

The present invention also provides a cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein said cleaning lever is provided with a slot which is long in the longitudinal direction not to disturb the transmission of scanning beams even when said cleaning lever is fully retracted inside.

The present invention also provides a cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein a stopping member is provided for stopping the further movement of said cleaning lever at the terminal end when said cleaning lever is fully retracted inside.

Further, the present invention is characterized in that said stopping member is formed in said mounting member for said cover glass.

Furthermore, the present invention is characterized in that said stopping member is formed in said guide member.

The present invention also provides a cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein a movement restriction means is provided for limiting the movement of said cleaning lever during retracting said cleaning lever inside and an engaging means is provided for engaging said movement restriction means.

Further, the present invention is characterized in that said movement restriction means is formed in said cleaning lever and said engaging means is formed in said mounting member for said cover glass.

The present invention is also characterized in that said movement restriction means is formed in said cleaning lever and said engaging means is formed in said guide member.

Further, the present invention is characterized in that said movement restriction means is formed in said mounting member for said cover glass and said engaging means is formed in said cleaning lever.

Furthermore, the present invention is characterized in that said movement restriction means is formed in said guide member and said engaging means is formed in said cleaning lever.

The present invention also provides a cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein a stopper is provided for preventing the cleaning lever from coming off said guide member when said cleaning lever is withdrawn.

The present invention is characterized in that a means for canceling said stopper is provided to allow the removal of the cleaning lever from said guide member so that the cleaning lever is detachable from an apparatus body.

The present invention also provides a cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein said cleaning member is detachably attached to the end of said cleaning lever.

Moreover, the present invention provides a cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein an elastic member is provided to press said cleaning member against the cover glass.

The cover glass cleaning mechanism of an optical scanning device according to the present invention comprises the cover glass disposed to project on the mounting member and a cleaning lever which is provided at its end with a cleaning member for wiping the surface of said cover glass and is structured that the stroke length of said cleaning lever is set such that said cleaning member can be moved to a position out of the end of the cover glass on at least one of ends in the operational direction of said cleaning lever. Therefore, when the cleaning lever is retracted fully inside, the cleaning member is out of the cover glass and thus moves to a level lower than the level of the surface of the cover glass so that the dist and dirt attached to the cleaning member are shaken off, thereby preventing dist and dirt remaining on the cleaning member from adhering to the cover glass again when the cleaning lever is returned. Therefore, even with repeated cleaning operation, the cleaning member and the surface of the cover glass can be maintained in the cleaned state.

Also in the present invention, the guide member is provided on the cover glass so that the cleaning lever is reciprocated along the guide member and parallel to the cover glass. Therefore, the cleaning member is pressed against the cover glass with constant pressure, thereby properly cleaning the cover glass uniformly without remaining non-cleaned portions. Further, the guide member prevents the cover glass from being contaminated by hands of an operator or adhesion of foreign matter.

The guide member extends over the entire length of the cover glass. Therefore, the cleaning member can be prevented from coming off the cleaning lever and thus prevented from being contaminated by touching portions other than the cover glass. By the existence of the guide member, the accuracy of position between the cleaning member and the cover glass is improved.

The cleaning lever is provided with the slot which is long in the longitudinal direction not to disturb the transmission of scanning beams even when the cleaning lever is fully retracted inside. Since the optical scanning device is therefore always available even in a state that the cleaning lever is attached, there is no need to detach and store the cleaning lever, thereby preventing the cleaning lever from being missing and further preventing a storing place from being contaminated by the cleaning lever.

The stopping member is provided for stopping the further movement of the cleaning lever at the terminal end when the cleaning lever is fully retracted inside. Therefore, the excessive movement of the cleaning lever is prevented, thereby achieving the economical movement of the cleaning lever.

The movement restriction means is provided for limiting the movement of the cleaning lever during retracting the cleaning lever inside and an engaging means is provided for engaging the movement restriction means. This structure can prevent such an event that dust and dirt attached to the cleaning member fly to the surface of the cover glass due to vibration of the cleaning lever. In addition, the engaging means composed of the concave and convex portions as mentioned above also functions as a click mechanism so that an operator can sensuously check when the cleaning lever reaches the traveling terminal position during pushing the cleaning lever. It should be noted that the number or parts can be reduced by integrally forming the engaging means to the mounting member.

The stopper is provided for preventing the cleaning lever from coming off the guide member when the cleaning lever is withdrawn. This structure eliminates the need of aligning the cleaning lever to the guide member for the operation of pushing the cleaning lever again, thus increasing the operability. This structure also prevents the cleaning lever from being missing.

The means for canceling the stopper is provided to allow the removal of the cleaning lever from the guide member so that the cleaning lever is detachable from an apparatus body. Therefore, the convenience in maintenance such as cleaning of the cleaning member and the replacement of the cleaning member according to deterioration is improved.

Further, the cleaning member is detachably attached to the end of the cleaning lever. Therefore, the inspection and the replacement of the cleaning member can be easily conducted.

Furthermore, since the elastic member is provided to press the cleaning member against the cover glass, dust and dirt adhering to the surface of the cover glass can be effectively removed.

BEST MODE FOR CARRYING OUT THE INVENTION

The principle and embodiments of an optical scanning device of the present invention will now be described in detail with reference to the accompanying drawings.

Figure 1:
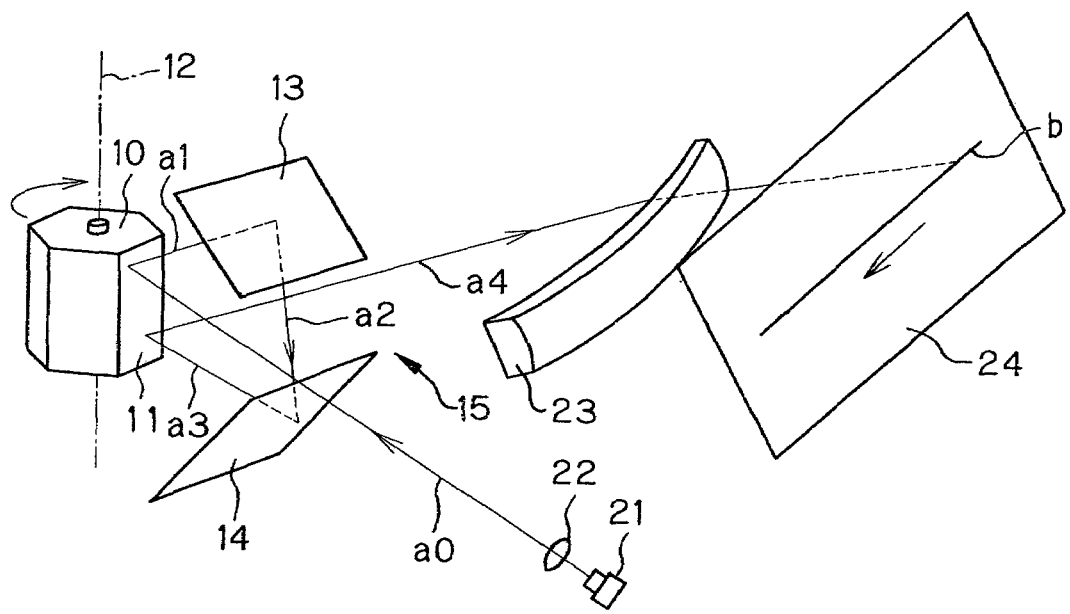
FIG. 1 is a perspective view showing the entire structure of an optical scanning device according to a first embodiment of the present invention.
Figure 2:
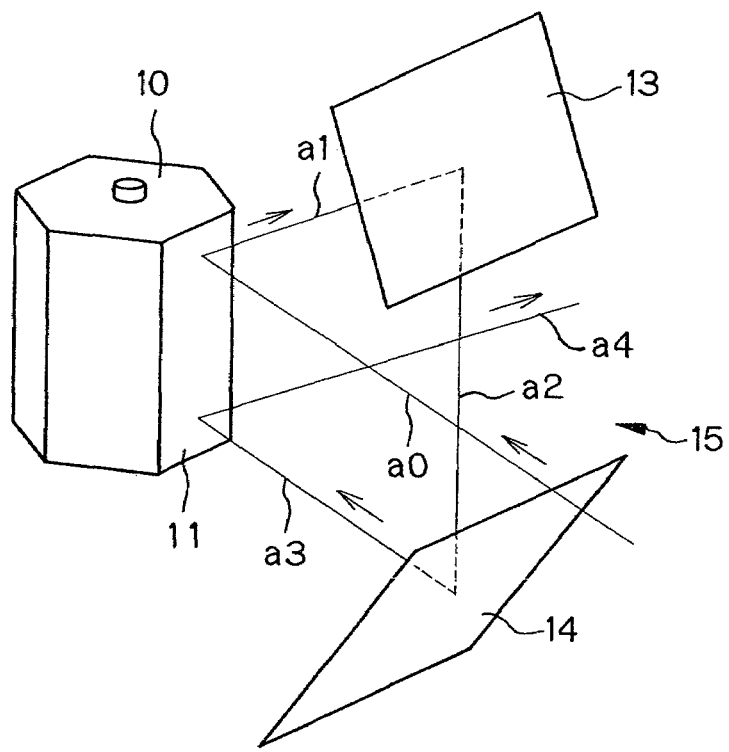
FIG. 2 is a perspective view showing the light deflective optical system as main parts of the optical scanning device shown in FIG. 1.

FIG. 1 is a perspective view showing the entire structure of an optical scanning device according to a first embodiment of the present invention and FIG. 2 is a perspective view showing the light deflective optical system as main parts of the optical scanning device.

According to this structure, an optical deflector is composed of a polygon mirror 10 taking a form of a polygonal column and having a plurality (six in the illustrated example) of deflective reflecting facets 11 on the peripheral sides of the polygonal column. The polygon mirror 10 rotates about its rotational axis 12 so that the deflective reflecting facets 11 revolve about the rotational axis 12. Two stationary plane mirrors 13, 14 are disposed to face a deflective reflecting facet 11 related to optical deflection so that these plane mirrors 13, 14 have an angle relative to each other and have a space 15 therebetween.

A light beam from a light source 21 is converted into a parallel light beam a0 by a lens 22 and is incident on the deflective reflecting facet 11 diagonally from below, in case of drawing taken along the rotational axis 12, through the space 15 between the stationary plane mirrors 13 and 14. The light beam a0 becomes a light beam a1 after the first reflection by the deflective reflecting facet 11. The light beam a1 proceeds diagonally upward to be incident on one stationary plane mirror 13. The light beam a1 becomes a light beam a2 after reflection at the stationary plane mirror 13. The light beam a2 proceeds downward to be incident on the other stationary plane mirror 14. The light beam a2 becomes a light beam a3 after reflection at the stationary plane mirror 14. The light beam a3 is incident on the deflective reflecting facet 11 again. The light beam a3 becomes a light beam a4 after the second reflection by the deflective reflecting facet 11. The light beam a4 proceeds diagonally upward through the space 15 between the stationary plane mirrors 13 and 14 and is converted into a focused light beam via a scanning optical system 23 and is focused to be incident on an imaging surface 24. Since the deflective reflecting facets 11 revolve about the rotational axis 12, the focused light beam moves at a rotational speed about four times as faster as the rotational speed of the deflective reflecting facets 11 to write a scan line b on the imaging surface 24. Adjacent deflective reflecting facets 11 successively come in and go away the position of incidence of the incident light beam a0 because of the rotation of the polygon mirror 10. As a result, according to the rotation of the polygon mirror 10, the scan lines b are successively written from one end to the other end on the imaging surface 24 at the same level. The scanning in this direction is called the main scanning. Sub scanning is conducted by moving a scanned substrate on the imaging surface 24 in a direction perpendicular to that of the main scanning at a constant rate. The main scanning and the sub scanning cooperate to achieve raster scanning in which scan lines b are aligned with a constant pitch on the scanned substrate.

The two stationary plane mirrors 13, 14 are disposed perpendicularly to the incident plane on the condition that the incident plane is defined as a plane being parallel to the rotational axis 12 and including the central ray of the incident light beam a0.

Figure 3:
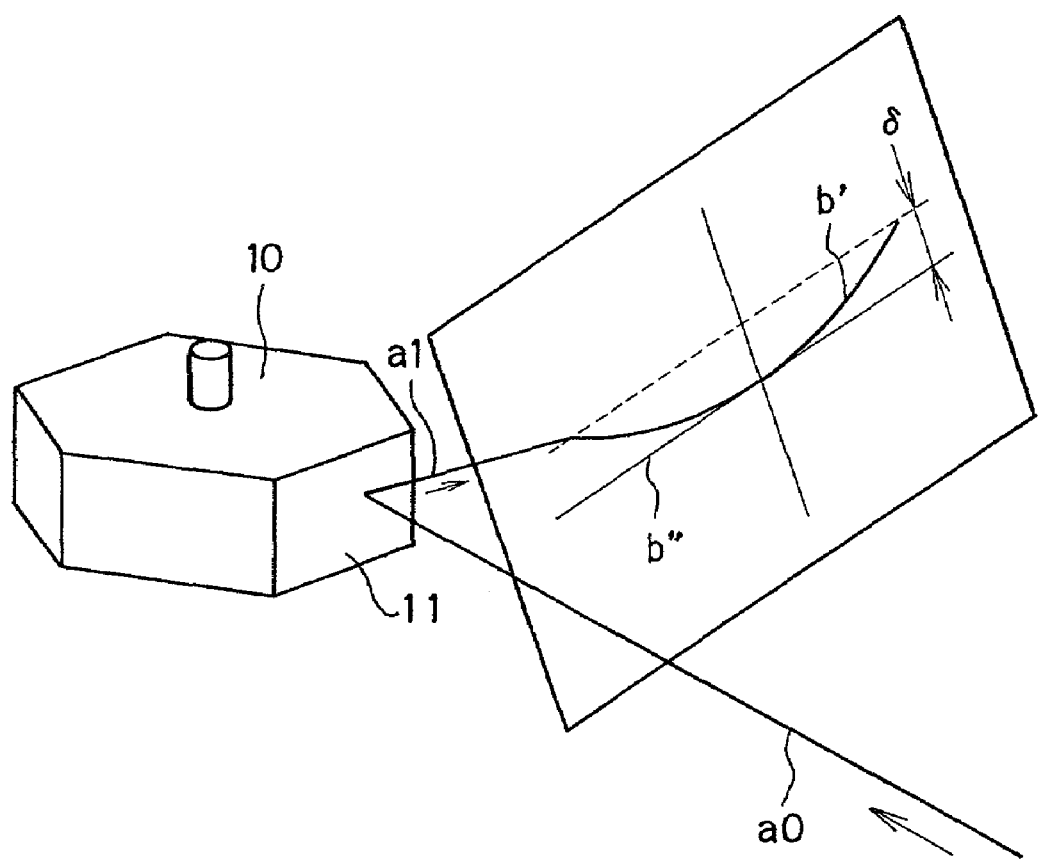
FIG. 3 is an illustration for explaining the curvature in scanning line trail of light beam after the first reflection at a deflective reflecting facet.

FIG. 3 is an illustration for explaining the curvature of the scanning line trail b' of the light beam a1 after the first reflection at the deflective reflecting facet 11. When the incident light beam a0 is not parallel to the rotational plane (plane perpendicular to the rotational axis 12) of the deflective reflecting facets 11, the scanning line trail b' of the light beam a1 reflected at the deflective reflecting facets 11 is curved as shown in FIG. 3. In FIG. 3, the degree of the curvature .delta. of the scanning line trail b' is defined by an amount shifting from the scanning line trail b" without curvature in a plane perpendicular to the light beam a1 on the incident plane. The difference between the scanning line b and the scanning line trail b', b" will be described. That is, the scanning line b is a scanning line trail of a beam collected onto the imaging surface 24 via a scanning optical system 23, while the scanning line trail is a trail of an emergent light beam a4 at any position from the deflective reflecting facet 11 to the imaging surface 24.

In the light deflective optical system of twice incidence type shown in FIG. 1 and FIG. 2, even when the scanning optical system 23 is adapted not to cause curvature in scanning line b due to angles θ1, θ2 (FIG. 4) of the incident light beam a0 and the emergent light beam a4, curvature in scanning line trail should be caused. The definition of angles θ1, θ2 will be described later.

In the deflective optical system of twice incidence type, curvature in scanning line trail is caused even between the first deflective reflection and the second deflective reflection as apparent from FIG. 3. However, light path length between the first deflection and the second deflection is fairly shorter than the light path length of the entire scanning optical apparatus (light path length from the first reflection point on the deflective reflecting facet 11 to the imaging surface 24) so that the degree of curvature caused between the first deflection and the second deflection is small. The curvature in scanning line trail caused according to the distance from the deflective reflecting facet 11 is rather dominant because of a difference in exit angle of the emergent light beam a4 according to the deflection in the light deflective optical system.

Hereinafter, the difference in exit angle caused by the deflection of the emergent light beam a4 in the structure as shown in FIG. 1 and FIG. 2 will be studied.

Figure 4:
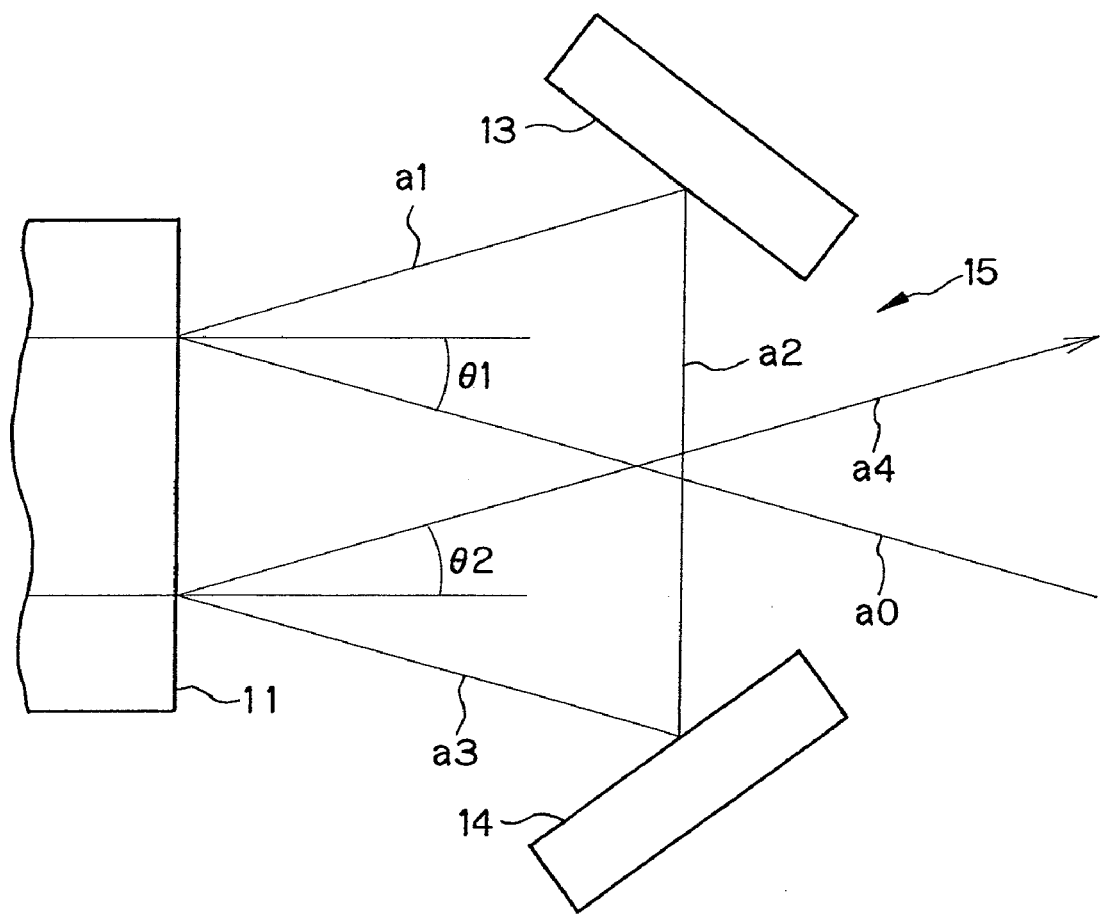
FIG. 4 is an illustration for explaining the definition of a relation between an incident angle $\theta 1$ of an incident light beam relative to a deflective reflecting facet and an exit angle $\theta 2$ of an emergent light beam.

As shown in FIG. 4, when the deflective reflecting facet 11 faces forthright, i.e. perpendicularly to the incident plane, all of the light beams a0 through a4 are on a plane of paper of the figure. It is assumed that the incident angle of the incident light beam a0 relative to the deflective reflecting facet 11 is θ1 and the exit angle of the emergent light beam a4 is θ2.

Figure 5:
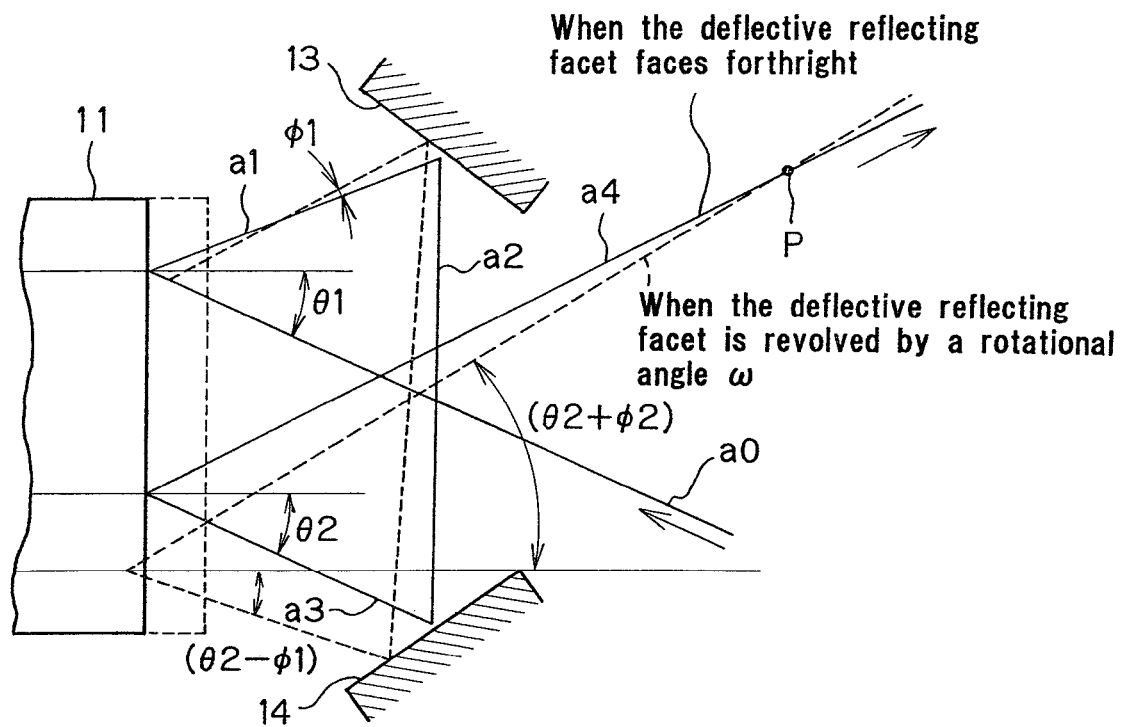
FIG. 5 is an illustration showing a state that light beams are projected on an incident plane.
Figure 6:
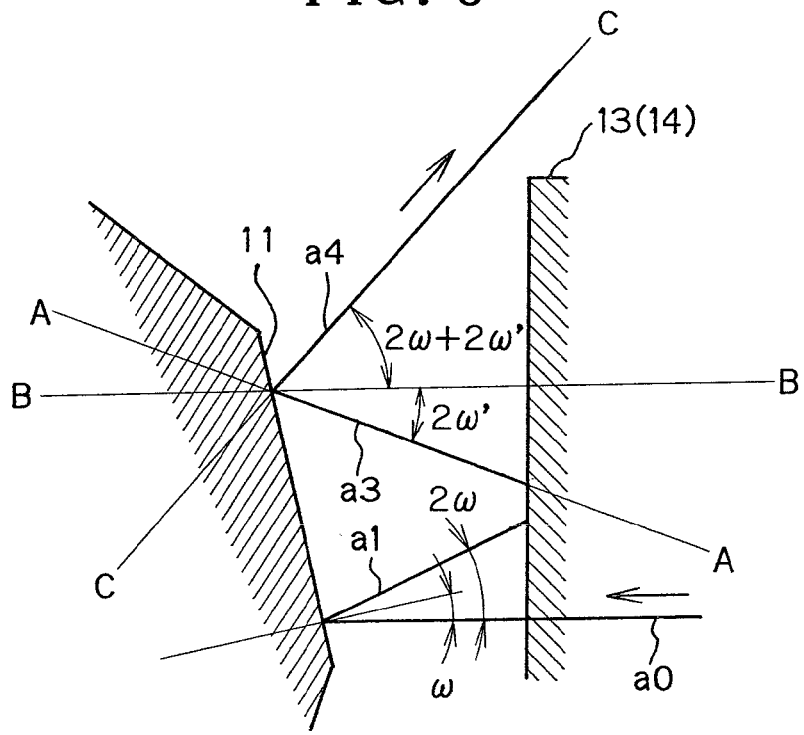
FIG. 6 is an illustration showing a state that the light beams are projected on a plane perpendicular to the rotational axis of the deflective reflecting facets.

FIG. 5 is an illustration showing a state that the light beams a0 through a4 are projected on the incident plane. In this figure, solid lines indicate the state when the deflective reflecting facet 11 faces forthright so that the light beams a0 through a4 are on the incident plane and broken lines indicate the state that the light beams a0 through a4 are projected on the incident plane when the deflective reflecting facet 11 is revolved by a rotational angle ω from the position where the deflective reflecting facet 11 faces forthright. FIG. 6 is an illustration showing that the light beams a0 through a4 are projected on a plane (rotation plane) perpendicular to the rotational axis 12 of the deflective reflecting facet 11 when the deflective reflecting facet 11 is revolved by a rotational angle ω from the position where the deflective reflecting facet 11 faces forthright.

Figure 7A:
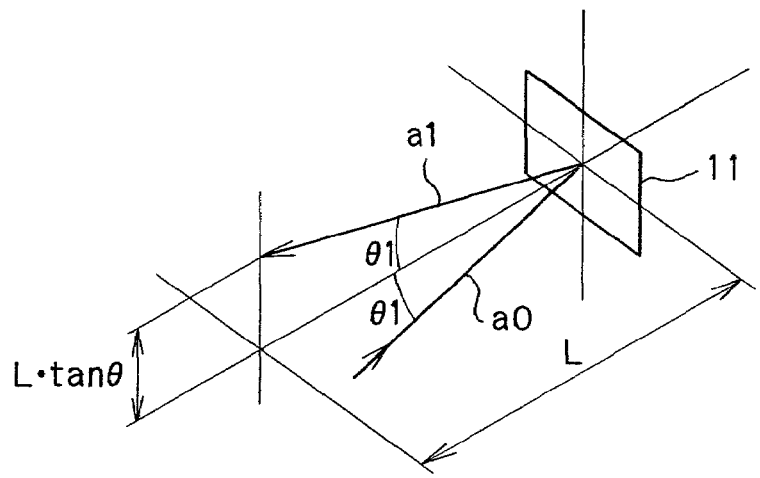
FIGS. 7(a), 7(b) are illustrations showing angular relations between light beams a0 and a1 when the deflective reflecting facet faces forthright and when the deflective reflecting facet is revolved by a rotational angle $\omega$.
Figure 7B:
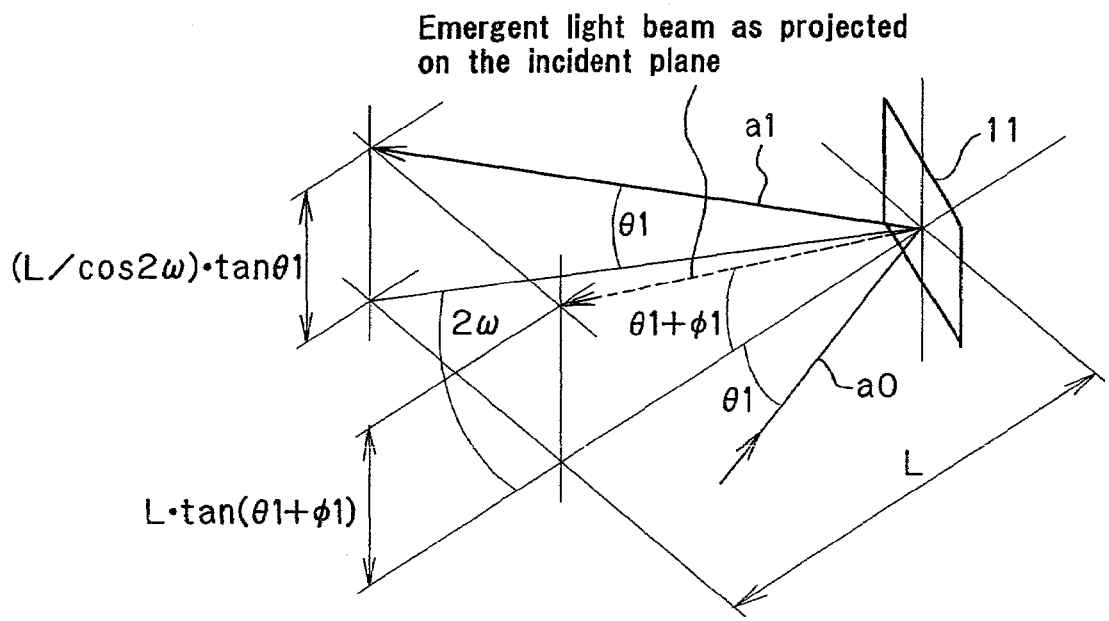
Figure 8:
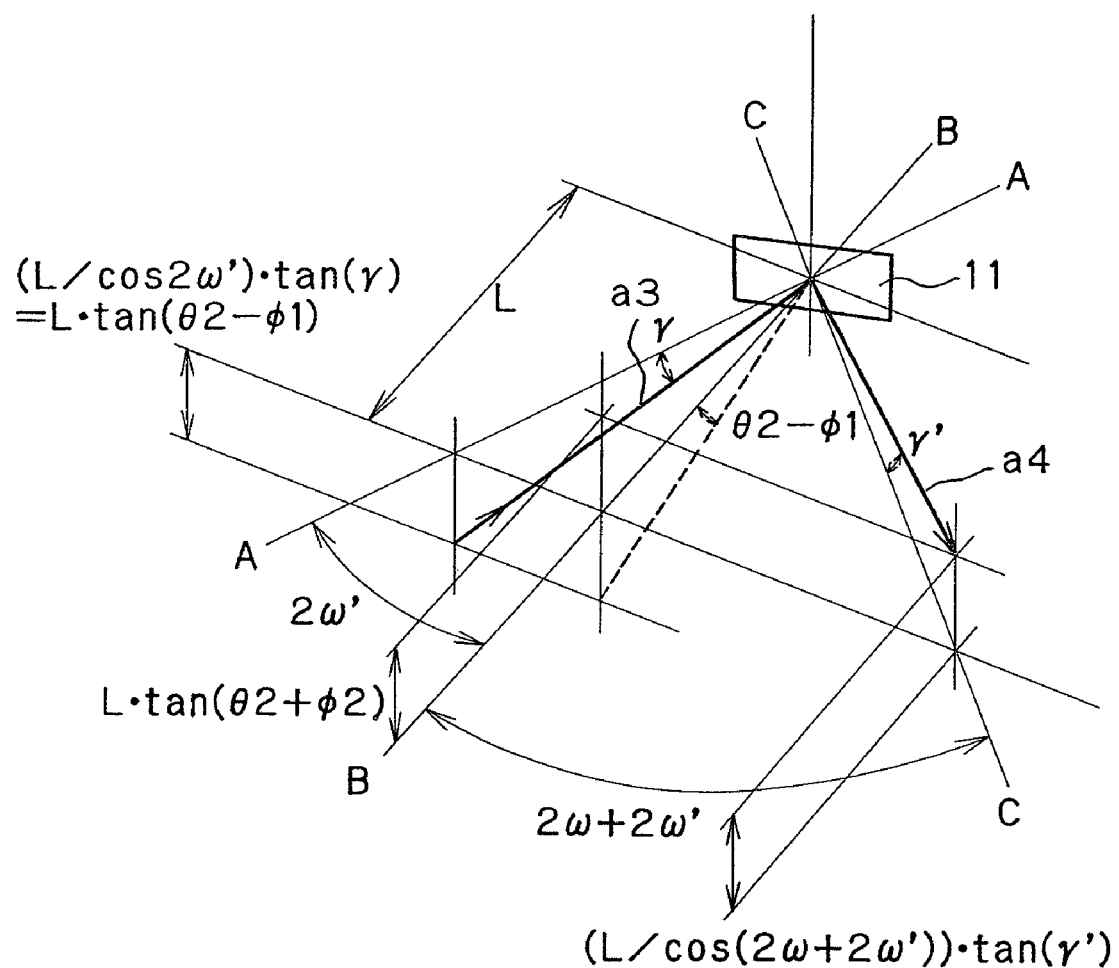
FIG. 8 is an illustration showing an angular relation when the deflective reflecting facet for light beams a3 and a4 is revolved by a rotational angle $\omega$.

FIGS. 7(a), 7(b) are illustrations showing angular relations between the light beams a0 and a1, wherein FIG. 7(a) shows the angular relation between the light beams a0 and a1 when the deflective reflecting facet 11 faces forthright and FIG. 7(b) shows the angular relation between the light beams a0 and a1 when the deflective reflecting facet 11 is revolved by a rotational angle α. FIG. 8 is an illustration showing an angular relation when the deflective reflecting facet for light beams a3 and a4 is revolved by a rotational angle ω. In these figures, as shown in FIG. 5, φ1 indicates a difference in exit angle of the light beam a1, as projected on the incident plane, between the exit angle when the deflective reflecting facet 11 faces forthright and the exit angle when the deflective reflecting facet 11 is revolved by the rotational angle ω, and φ2 indicates a difference in exit angle of the light beam a4, as projected on the incident plane, between the exit angle when the deflective reflecting facet 11 faces forthright and the exit angle when the deflective reflecting facet 11 is revolved by the rotational angle ω. In addition, 2ω' indicates an angle of the light beam a3 relative to the incident plane as projected on a plane perpendicular to the rotational axis 12 of the deflective reflecting facet 11 when the deflective reflecting facet 11 is revolved by the rotational angle ω as shown in FIG. 6.

As mentioned above, the difference in exit angle caused by the deflection of the emergent light beam a4 is an angle φ2 formed between the emergent light beam a4 when the emergent light beam a4 is on the incident plane and a straight line as the emergent light beam a4 being projected on the incident plane when the deflective reflecting facet 11 is revolved by the maximum rotational angle ω in FIG. 5 which is a projection drawing showing a state that all light beams being projected on the incident plane.

As the scanning optical system 23 of the light scanning device, an optical member as a molded plastic or the like which is long in the scanning direction of the light beam a4 is generally used. In the optical member of a molded plastic, it is difficult to have an effective range of more than about 5 mm in the transverse direction. Therefore, it is desired to limit the curvature of scanning line trail at the position of the scanning optical system 23 to about 5 mm or less.

The curvature of scanning line trail can be limited within the lens effective range of the scanning optical system 23 by making the straight line as the central ray of the emergent light beam a4 being projected on the incident plane when the deflective reflecting facet 11 is revolved by the maximum rotational angle ω to be substantially parallel to the central ray of the emergent light beam a4 when the emergent light beam a4 is on the incident plane (that is, making the emergent light beam a4 indicated by a broken line to be substantially parallel to the emergent light beam a4 indicated by a solid line in FIG. 5). The aforementioned "substantially parallel" state is in such a range that the curvature in scanning line trail on the lens composing the scanning optical system 23 can be limited within 5 mm, this value being decided according to the limitation of the effective range in the transverse direction of the optical member composed of a molded plastic. It should be noted that central ray means light ray passed through the optical axis of the lens 22 composing the illumination optical system. The light beams a0 through a4 as described later mean such light rays.

Here, the aforementioned difference in exit angle φ2 will be studied.

First, the first deflection will be considered. As apparent from FIG. 7(b), φ1 is given by:

$$L \cdot \tan(\theta 1 + \phi 1) = L \cdot \tan \theta 1 / \cos 2\omega \quad (1)$$

$$\therefore \phi 1 = \tan^{-1}(\tan \theta 1 / \cos 2\omega) - \theta 1 \quad (2)$$

Now, the light beam a3 to be incident again upon the deflective reflecting facet 11 will be considered.

Figure 9:
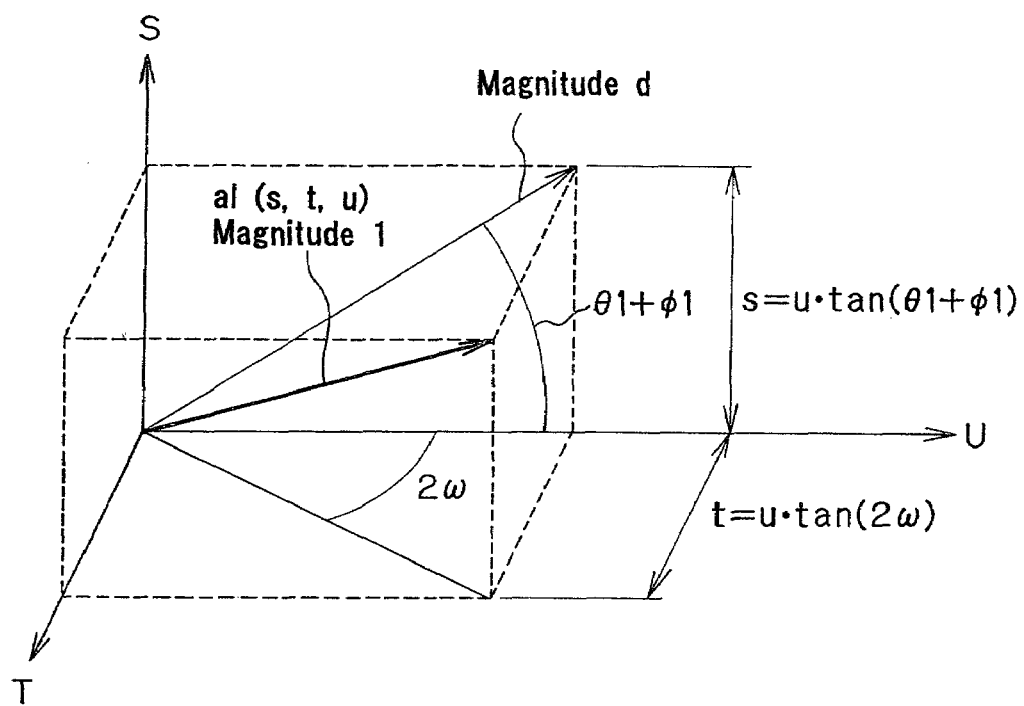
FIG. 9 is an illustration for studying components of the directional vector of the light beam a1 after the first reflection at the deflective reflecting facet.

The following explanation will be made using a coordinate system comprising coordinate axes S, T, and U as shown in FIG. 9, in which the incident plane corresponds to an S-U plane and the plane perpendicular to the rotational axis 12 of the deflective reflecting facets 11 corresponds to a T-U plane. Assuming that components in the axial directions S, T, and U of the directional vector (unit vector) of the light beam a1 after the first reflection at the deflective reflecting facet 11 are represented by (s, t, u), respectively, the following equation is obtained:

$$\sqrt{(s^2 + t^2 + u^2)} = 1 \quad (3)$$

The magnitude d of the directional vector of the light beam a1 as projected on the S-U plane is given by:

$$d = \sqrt{(s^2 + u^2)} \quad (4)$$

Because the rotational angle of the deflective reflecting facet 11 is ω, the following equations are obtained:

$$u \cdot \tan 2\omega = t \quad (5)$$

$$u \cdot \tan(\theta 1 + \phi 1) = s \quad (6)$$

From the equations (3), (5), and (6), the following equation can be obtained:

$$u^2 = 1 / \{\tan^2(\theta 1 + \phi 1) + \tan^2 2\omega + 1\} \quad (7)$$

From the equations (4), (6), and (7), the following equation can be obtained:

$$d^2 = u^2 \cdot \{\tan^2(\theta 1 + \phi 1) + 1\} \quad (8)$$
$$= \{\tan^2(\theta 1 + \phi 1) + 1\} / \{\tan^2(\theta 1 + \phi 1) + \tan^2 2\omega + 1\}$$

Figure 10:
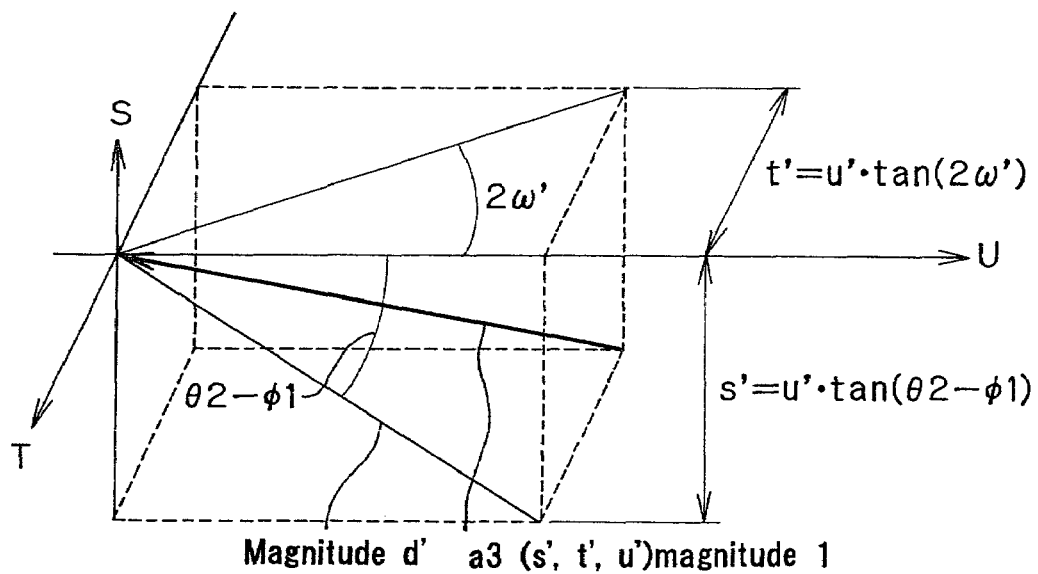
FIG. 10 is an illustration for studying components of the directional vector of the light beam a3 to be incident again on the deflective reflecting facet.

Also as for FIG. 10, using a coordinate system similar to that of FIG. 9 and assuming that components in the axial directions S, T, and U of the directional vector (unit vector) of the light beam a3 to be incident again on the deflective reflecting facet 11 are represented by (s', t', u'), respectively, the following equation is obtained:

$$\sqrt{(s'^2 + t'^2 + u'^2)} = 1 \quad (9)$$

Since the light beam is reflected at the stationary plane mirrors 13 and 14 perpendicular to the S-U plane (incident plane) after the first deflection before the second deflection, the magnitude d' of (s', t', u') as projected on the S-U plane (the magnitude d' of the directional vector of the light beam a3 as projected on the S-U plane) satisfies the condition of d'=d. Therefore, the magnitude d' is given by:

$$d' = d = \sqrt{(s'^2+u'^2)} = \sqrt{(s^2+u^2)} \quad (10)$$

Further, the following equations are obtained:

$$u' \cdot \tan 2\omega' = t' \quad (11)$$

$$u' \cdot \tan(\theta 2 - \phi 1) = s' \quad (12)$$

From the equations (9) and (10), the following equation can be obtained:

$$t'^2 = 1 - d^2 \quad (13)$$

From the equations (9), (12), and (13), the following equation can be obtained:

$$u'^2 \cdot \{\tan^2(\theta 2 - \phi 1) + 1\} + (1 - d^2) = 1 \quad (14)$$

$$\therefore u'^2 = d^2 / \{\tan^2(\theta 2 - \phi 1) + 1\} \quad (15)$$

From the equations (11) and (15), the following equation can be obtained:

$$|2\omega'| = |\tan^{-1}(t'/u')| \quad (16)$$
$$= \tan^{-1}\left[\sqrt{(1-d^2)\{\tan^2(\theta 2 - \phi 1)+1\}/d^2}\right]$$

wherein $d^2$ in the equation (16) is defined in the equation (8).

Now, the second deflection from the light beam a3 to the light beam a4 will be considered. See A-A section and B-B section (parallel to the incident plane) of FIG. 8. The following equation is obtained:

$$\tan \gamma = \tan(\theta 2 - \phi 1) \cdot \cos 2\omega' \quad (17)$$

Since γ' of C-C section satisfies the condition of γ'=γ, the following equation is obtained:

$$\tan \gamma' = \tan \gamma = \tan(\theta 2 - \phi 1) \cdot \cos 2\omega' \quad (18)$$

When the C-C section is projected on the incident plane, the following equation is obtained:

$$\tan(\theta 2 + \phi 2) = \tan \gamma' / \cos(2\omega + 2\omega') \quad (19)$$
$$= \cos 2\omega' \cdot \tan(\theta 2 - \phi 1) / \cos(2\omega + 2\omega')$$

As this equation (19) is expanded with regard to φ2, the following equation is obtained:

$$\phi 2 = \tan^{-1}\{\cos 2\omega' \cdot \tan(\theta 2 - \phi 1)/\cos(2\omega + 2\omega')\} - \theta 2 \quad (20)$$

From the equations (20), (16), and (8), the difference in exit angle φ2 between the emergent light beam a4 when the emergent light beam a4 is on the incident plane and a straight line as the emergent light beam a4 being projected on the incident plane when the deflective reflecting facet 11 is revolved by the maximum rotational angle ω can be obtained by using known values.

Figure 11:
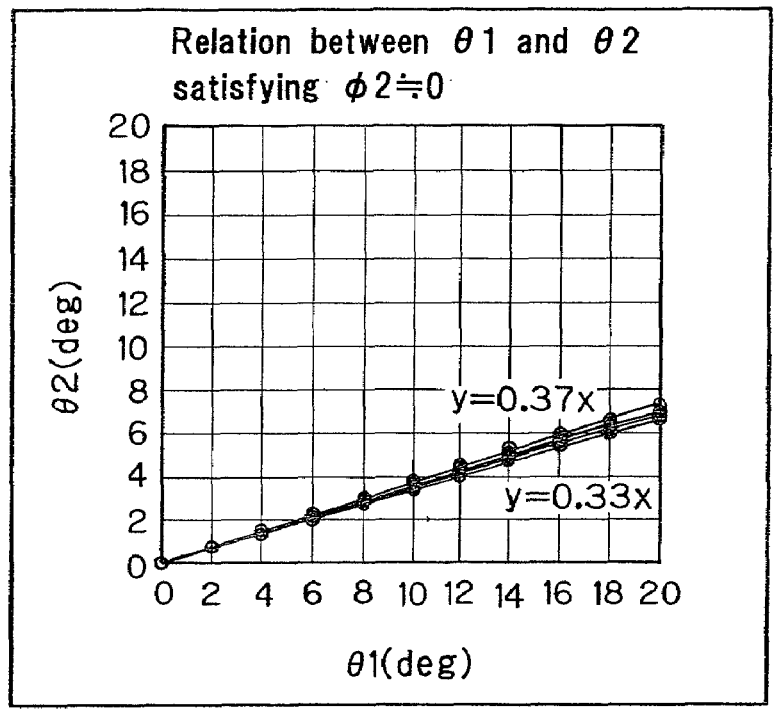
FIG. 11 is a graph plotting the relation between $\theta 1$ and $\theta 2$ which satisfies $\Phi 2=0$.

FIG. 11 is a graph plotting the relation between θ1 and θ2 which satisfies Φ2=0 relative to cases of ω=7.5°, ω=10°, ω=12.5°, and ω=17.5°. The reason why the lower limit and the upper limit are 7.5° and 17.5° is that the deflection angle of the deflected light beam a4 is substantially ±4ω so that the minimum value and the maximum value are realistically about ±30° and ±70°. As a result of FIG. 11, it is found that the change of curvature in scanning line trail at the optical axial directional position can be minimized by setting the relation between θ1 and θ2 into a range represented by the following equation (21):

$$0.33 \cdot \theta 1 \leq \theta 2 \leq 0.37 \cdot \theta 1 \quad (21)$$

In resent scanning optical devices of electrophotographic process, non-spherical molded plastic optical parts such as toric lenses are generally used for the scanning optical system 23 in order to reduce the number of lenses. However, it is difficult to achieve high precision manufacture of non-spherical optical surface as compared to the manufacture of spherical optical surface so that such a non-spherical optical surface has further small effective range in the sub-scanning direction. Accordingly, it is needed to limit the curvature of scanning line trail within a smaller range of about 3 mm or less if such an optical surface is used. To satisfy this condition, it is preferable to set the difference in exit angle Φ2 to be Φ2≦0.6°.

That is, for example, assuming that the deflective angle (entire angle) of the deflected light beam a4 is 65°, a focusing distance of 277 mm is required when the length of main scanning direction of the imaging surface 24 is the length of the short side of A3 size paper plus the distance for detecting synchronization signal of scanning, that is, 310 mm. Assuming that the distance from the deflective reflecting facet 11 to the part (scanning optical system 23) having non-spherical optical surface is up to about 277 mm which is equal to the focusing distance and that Φ2=0.6° is satisfied, 277×tan(0.6°) =2.9 mm so that the curvature in scanning line trail can be limited within 3 mm. Though the distance from the deflective reflecting facet 11 to the optical surface of the scanning optical system 23 being 277 mm, the distance may not be limited to this value. The curvature in scanning line trail on the optical surface can be limited to be about 3 mm by arranging the optical part having a surface, not a simple spherical surface, obtained by relatively difficult process as the scanning optical system 23 to have a distance of 286 mm or less from the deflective reflecting facet 11 and Φ2≦0.6°.

Figure 12:
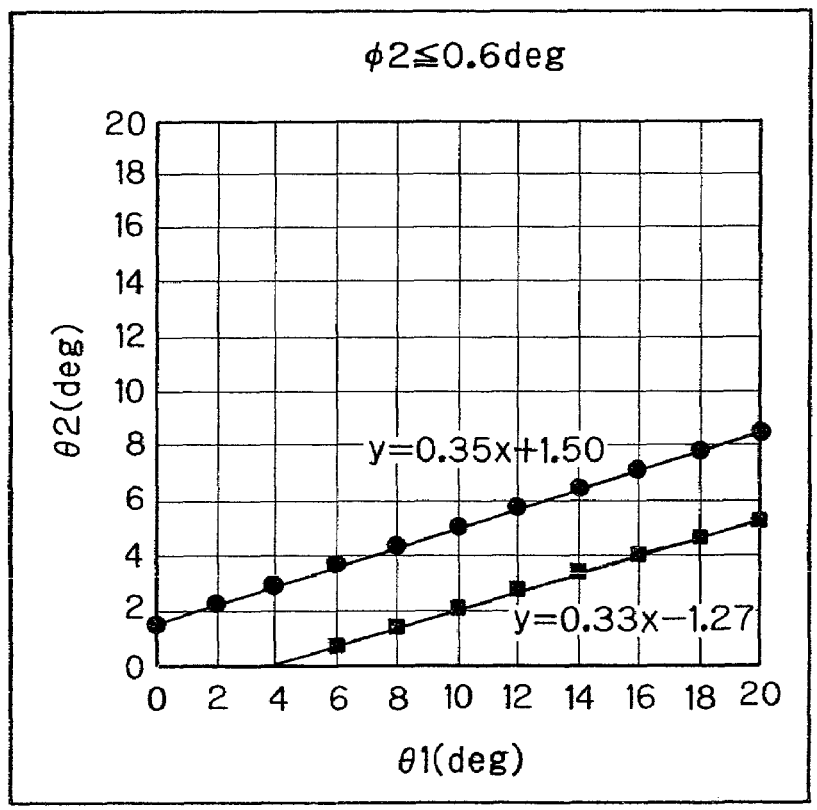
FIG. 12 is a graph showing a boundary of a range satisfying $\Phi \leq 0.6°$.

FIG. 12 is a graph showing a boundary of a range satisfying Φ2=0.6° relative to the deflection angle (semiangle) of light beam of 50° or less. From FIG. 12, the following equation is obtained:

$$0.33 \cdot \theta 1 - 1.27 \leq \theta 2 \leq 0.35 \cdot \theta 1 - 1.50 \quad (22)$$

The realistic curvature in scanning line trail at the position of the scanning optical system 23 can be limited to be 3 mm or less by setting θ1 and θ2 to satisfy the relation of the equation (22).

When higher surface precision of optical surface in the scanning optical system 23 is required in order to obtain higher imaging property, the optical surface is disposed near the intersection P shown in FIG. 5 (an intersection of the emergent light beam a4 (solid line) when the deflective reflecting facet 11 faces forthright and the emergent light beam a4 is on the incident plane and the emergent light beam a4 (broken line) as the emergent light beam a4 being projected on the incident plane when the deflective reflecting facet 11 is revolved by the maximum rotational angle ω) so that the curvature in scanning line trail on the lens surface near the intersection P is substantially zero, thereby achieving the scanning optical system 23 in which the required effective range in the sub-scanning direction is very small.

On the assumption that a rotary polygonal mirror (polygon mirror) 10 is used as the deflective reflecting facet 11, and that when the emergent light beam a4 is on the incident plane, the optical length between the first deflective reflection point and the second deflective reflection point is DL, the distance from the reflected point of the second deflection to the lens surface near the intersection P of the scanning optical system 23 is S, and the distance from the deflective reflecting facet 11 to the rotary axis 12 is R, the relation between the incident angle θ1 and the exit angle θ2 making the curvature δ to be zero can be calculated.

Figure 13A:
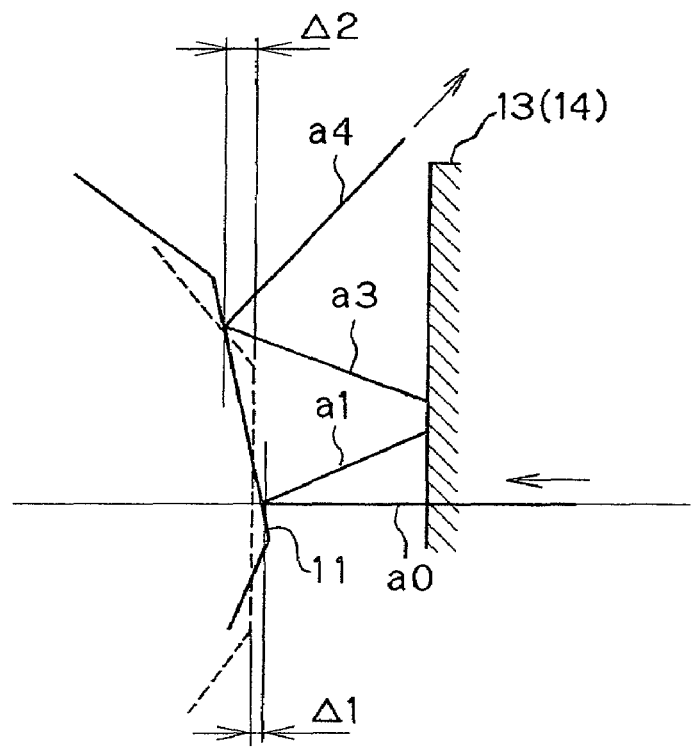
FIGS. 13(a), 13(b) are illustrations for explaining a sag amount $\Delta 1$ at the first deflective reflection point and a sag amount $\Delta 2$ at the second deflective reflection point according to the revolution of the deflective reflecting facets.
Figure 13B:
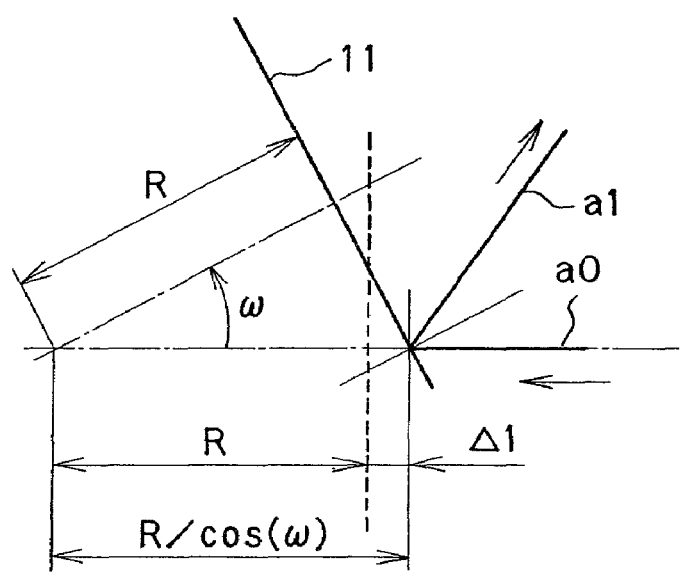

FIG. 13(a) is an illustration for explaining a sag amount Δ1 at the first deflective reflection point and a sag amount Δ2 at the second deflective reflection point according to the revolution of the deflective reflecting facet 11 and FIG. 13(b) is an enlarged view showing a portion near the first deflective reflection point, where Δ'=Δ1+Δ2. In FIGS. 13(a), 13(b), solid lines indicate a position where the deflective reflecting facet 11 of the rotary polygonal mirror 10 is revolved by the maximum rotational angle ω and broken lines indicate a position where the deflective reflecting facet 11 faces forthright.

From FIG. 13(b), assuming that the rotary polygonal mirror 10 is used as the deflective reflecting facet 11, Δ1 is calculated by the following equation where the radius of an inscribed circle of the rotary polygonal mirror 10 is R:

$$\Delta 1 = R(1-\cos \omega)/\cos \omega \quad (23)$$

Figure 14A:
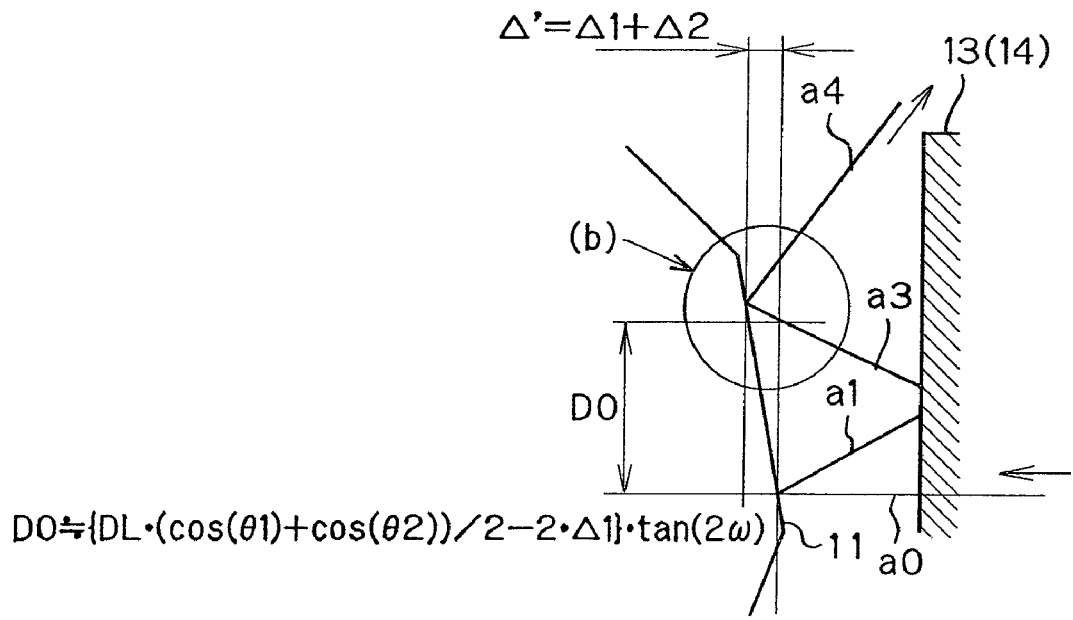
FIGS. 14(a), 14(b) are an illustration for explaining a' which is the sag amount $\Delta 1$ at the first deflective reflection point plus the sag amount $\Delta 2$ at the second deflective reflection point according to the revolution of the deflective reflecting facets, and an enlarged view of a portion near the second deflective reflection point.
Figure 14B:
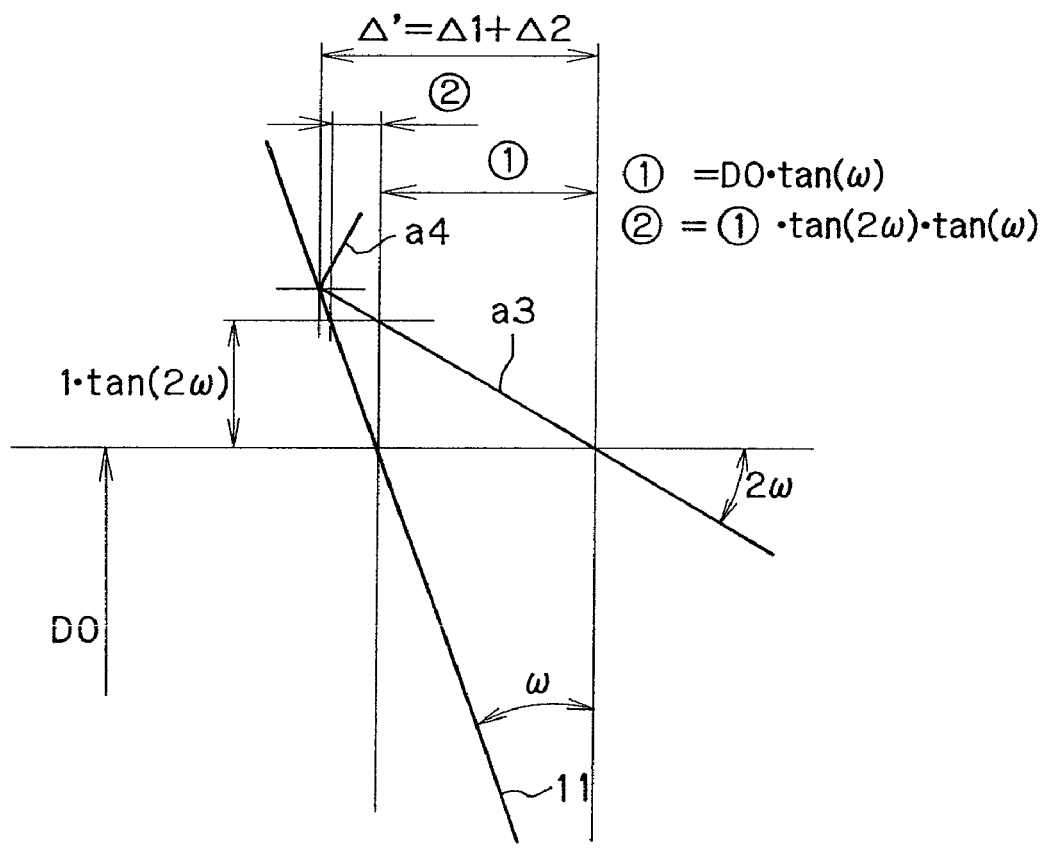

FIG. 14(a) is an illustration for explaining Δ' which is the sag amount Δ1 at the first deflective reflection point plus the sag amount Δ2 at the second deflective reflection point according to the revolution of the deflective reflecting facets and FIG. 14(b) is an enlarged view of a portion near the second deflective reflection point. As D0 is taken as shown in FIG. 14(a), Δ' is calculated by the following equation from FIGS. 14(a), 14(b):

$$\Delta' = \quad (24)$$
$$D0 \cdot \tan\omega + D0 \cdot \tan\omega \cdot \tan 2\omega \cdot \tan\omega + D0 \cdot \tan\omega \cdot (\tan 2\omega \cdot \tan\omega)^2 + \ldots$$

Since this equation is an endless addition in geometrical progression with the first term of D0·tan ω and the geometrical ratio of tan 2ω·tan ω, the following equation is obtained:

$$\Delta' = D0 \cdot \tan \omega/(1-\tan 2\omega \cdot \tan \omega) \quad (25)$$

That is, $$\Delta 2 = \Delta' - \Delta 1 \quad (26)$$
$$= D0 \cdot \tan\omega/(1-\tan 2\omega \cdot \tan\omega) - \Delta 1$$
$$= \left[\left(\frac{DL(\cos\theta 1 + \cos\theta 2)}{2 - 2 \cdot \Delta 1}\right) \cdot \frac{\tan 2\omega \times \tan\omega}{(1-\tan 2\omega \cdot \tan\omega)}\right] - \Delta 1$$

Figure 15A:
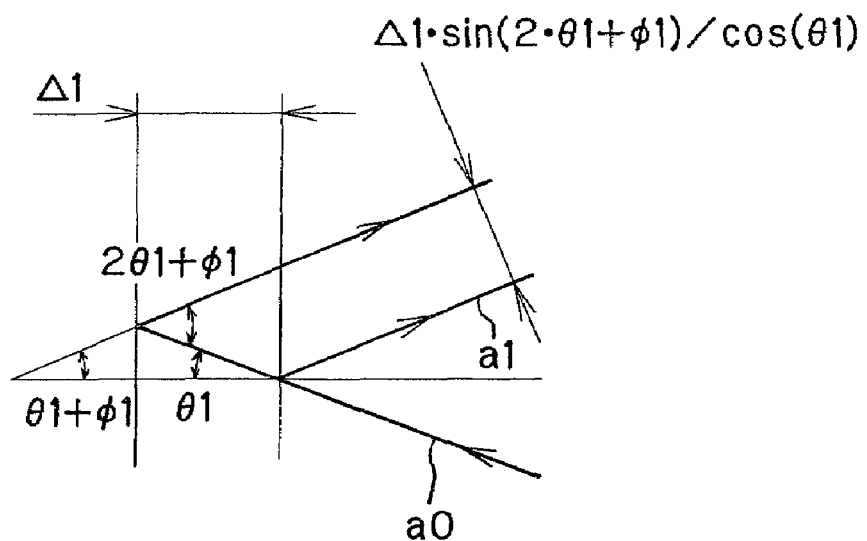
FIGS. 15(a), 15(b) are illustrations showing shift amounts between reflected light beams a1 and a4 based on a sag amount $\Delta 1$ at the first deflective reflection point and a sag amount $\Delta 2$ at the second deflective reflection point.
Figure 15B:
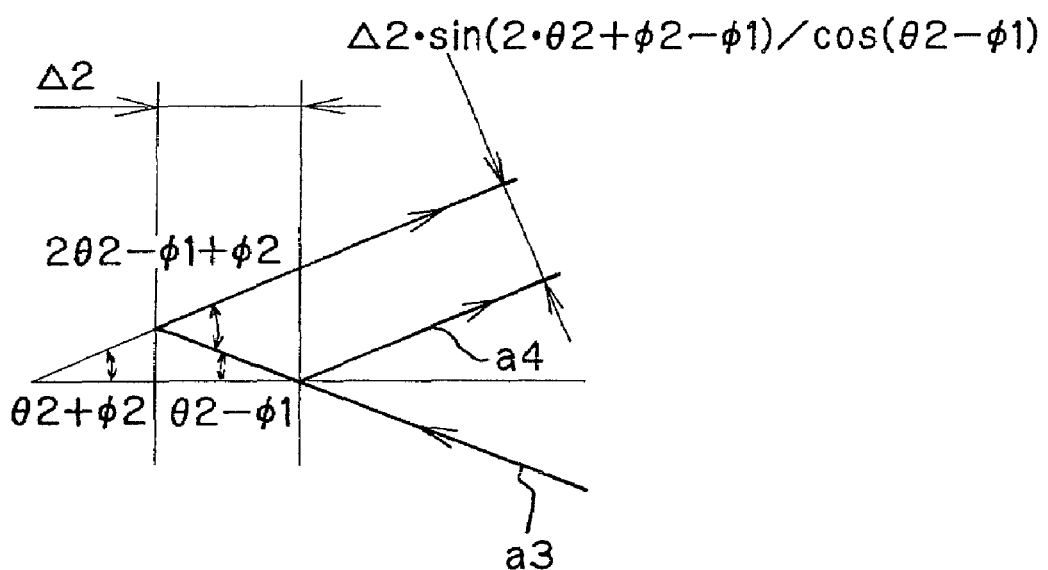

The curvature δ in the optical surface at this time is represented by the following equation based on FIGS. 15(a), 15(b). FIGS. 15(a), 15(b) are illustrations showing shifting amounts of reflected light beams a1, a4 according to the sag amount Δ1 at the first deflective reflection point and the sag amount Δ2 at the second deflective reflection point. In the equation, φ1 and φ2 are both zero.

$$\delta = S \cdot \tan\phi 2 - DL \cdot \tan\phi 1 + \Delta 1 \cdot \sin(2 \cdot \theta 1 + \phi 1)/\cos\theta 1 + \quad (27)$$
$$\Delta 2 \cdot \sin(2 \cdot \theta 2 + \phi 2 - \phi 1)/\cos(\theta 2 - \phi 1)$$

The first paragraph of this equation is based on the difference between the exit angles before and after the second reflection and the second paragraph is based on the difference between the exit angles before and after the first reflection. Though these values are not so large, the differences lead to a curvature in scanning line trail between the first θdeflective reflection point and the second deflective θreflection point as mentioned above. The third paragraph is based on the sag amount Δ1 at the first deflective reflection point and the fourth paragraph is based on the sag amount Δ2 at the second deflective reflection point. In the equation, φ1 is a value obtained by the equation (2) and φ2 is a value obtained by the equation (20).

Figure 16:
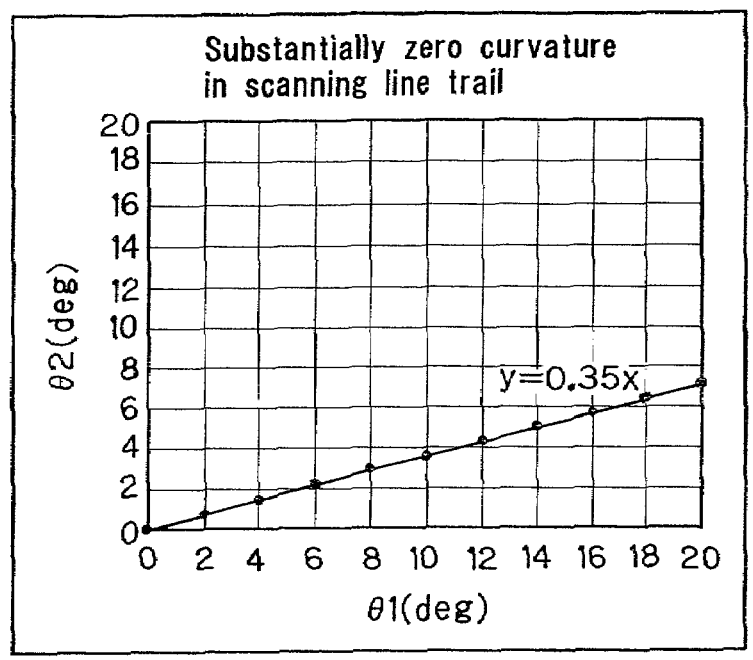
FIG. 16 is a graph showing the relation between $\theta 1$ and $\theta 2$ where the curvature $\delta$ is substantially 0 in the first example of the first embodiment.

From the equations (27), (23), and (26), when it is assumed that the optical length between the first deflective reflection and the second deflective reflection is DL=20 mm, the distance from the second deflective reflection point to the optical surface is S=100 mm, the distance from the deflective reflecting facet 11 to the rotational axis 12 thereof is R=20 mm, and the maximum deflection angle of the deflective reflecting facet 11 is ω=15°, the relation between θ1 and θ1 making the curvature δ to be substantially zero can be obtained and is shown in FIG. 16. The curvature δ in scanning line trail on the optical surface becomes substantially zero if the relation represented by the following equation is satisfied:

$$\theta 2 = 0.39 \cdot \theta 1 \quad (28)$$

Though the parameters are set to be values for an image forming apparatus such as an actual laser beam printer in the aforementioned embodiment, the present invention is not limited to the equation (28) and the aforementioned values set for the parameters.

Though the aforementioned study was made about the light deflective optical system in which a light beam a0 is incident on the deflective reflecting facet 11 through the space 15 between the two stationary plane mirrors 13 and 14 and a light beam a4 exits through the space 15 between the stationary plane mirrors 13 and 14, the study is also adopted to a light deflective optical system in which a light beam a0 is incident from above or below two stationary plane mirrors 13 and 14 and a light beam a4 exits through a space 15 between the stationary plane mirrors 13 and 14 such that the stationary plane mirror 14 as one of the stationary plane mirrors 13 and 14 is disposed to be sandwiched between the incident light beam a1 and the emergent light beam a4 or a light deflective optical system having a light path contrary to the above.

Figure 17:
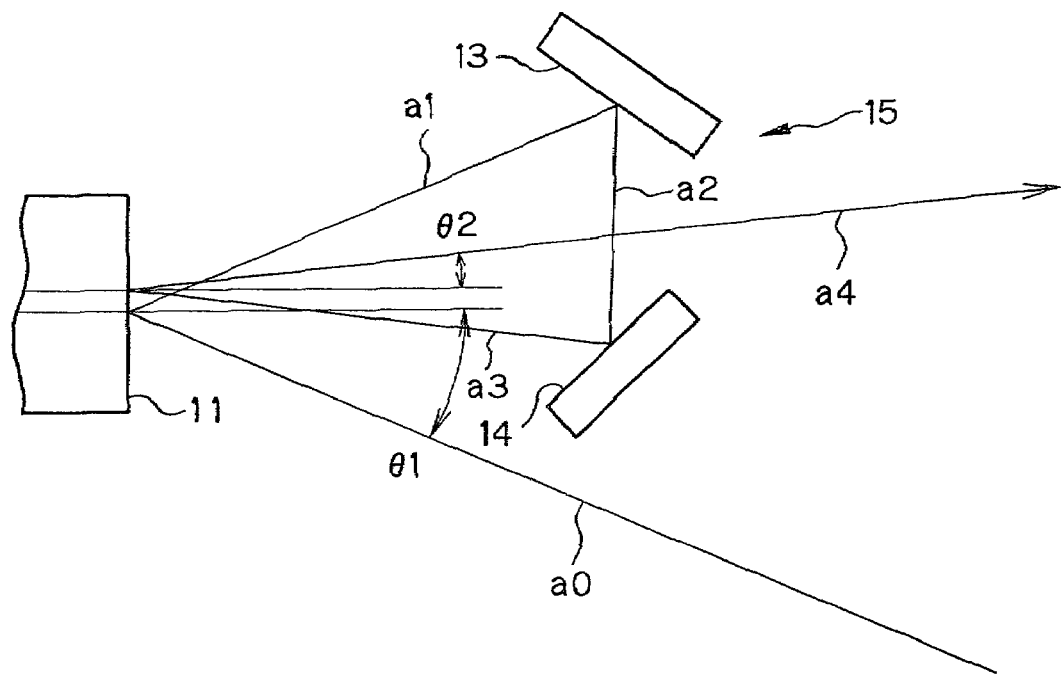
FIG. 17 is an illustration of a light deflective optical system as main parts of an optical scanning device according to a variation of the first embodiment of the present invention and showing the angular relation between light beams a1 and a4 when the deflective reflecting facet faces forthright.

The arrangement shown in FIG. 4 has an advantage that there is no limitation in size of the stationary plane mirrors 13, 14 so as to allow the use of inexpensive mirrors. The arrangement shown in FIG. 17 has an advantage that the first and second deflective reflection points can be brought to close to each other so as to reduce the dimension in the rotational axial direction of the deflective reflecting facet 11.

An optical scanning device according to a second embodiment of the present invention will be described with reference to FIG. 18.

Figure 18:
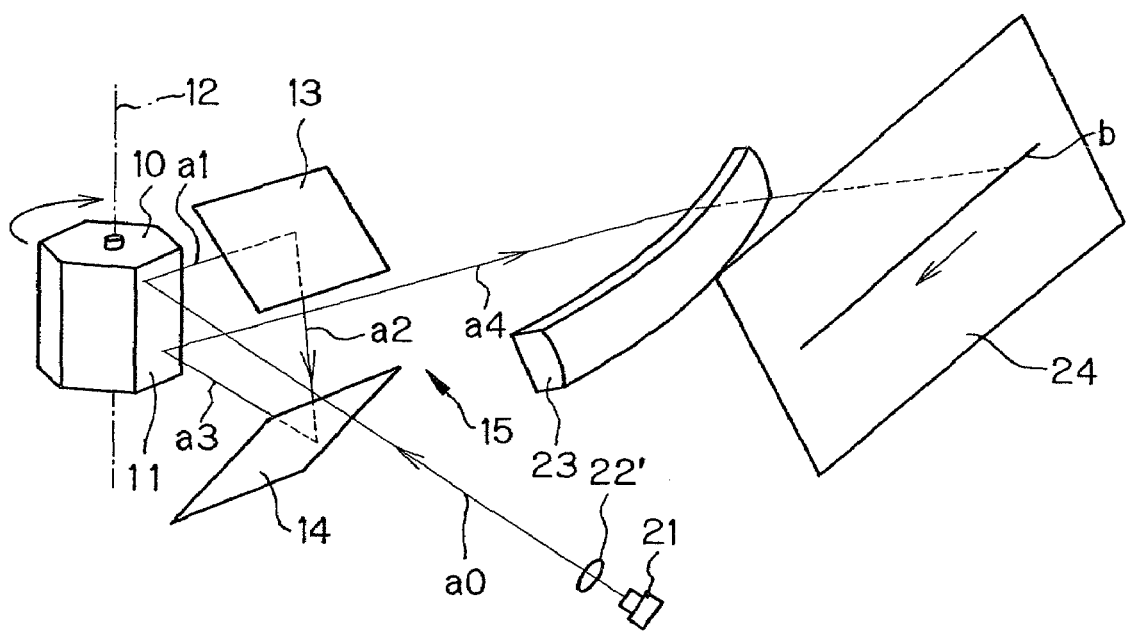
FIG. 18 is a perspective view showing the entire structure of an optical scanning device according to a second embodiment of the present invention.
Figure 19:
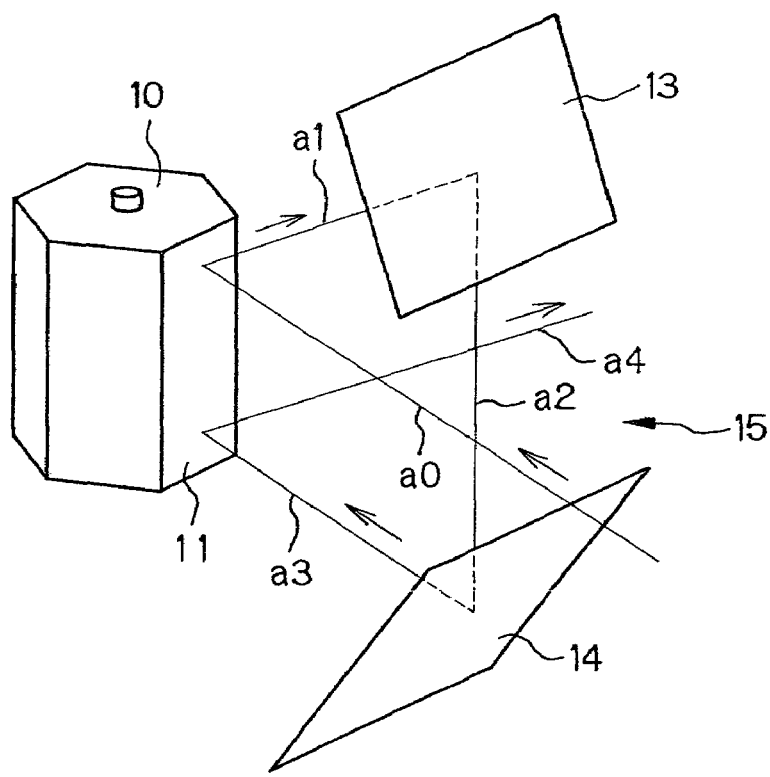
FIG. 19 is a perspective view showing the light deflective optical system as main parts of the optical scanning device shown in FIG. 18.

FIG. 18 is a perspective view showing the entire structure of the optical scanning device according to another embodiment of the present invention and FIG. 19 is a perspective view showing a light deflective optical system as main parts of the optical scanning device.

In the optical scanning device according to the first embodiment of the present invention as mentioned above, the lens with numeral 22 in FIG. 1 is a collimator lens so that the light beam converted by the lens 22 is a parallel beam which is parallel to both the direction perpendicular to and the direction parallel to the rotational axis 12. In the optical scanning device according to the second embodiment, however, a lens with numeral 22' in FIG. 18 is an anamorphic lens. This is a point different from the first embodiment.

According to this structure, an optical deflector is composed of a polygon mirror 10 taking a form of a polygonal column and having a plurality (six in the illustrated example) of deflective reflecting facets 11 on the peripheral sides of the polygonal column. The polygon mirror 10 rotates about its rotational axis 12 so that the deflective reflecting facets 11 revolve about the rotational axis 12. Two stationary plane mirrors 13, 14 are disposed to face a deflective reflecting facet 11 related to optical deflection so that these plane mirrors 13, 14 have an angle relative to each other and have a space 15 therebetween.

A light beam a0 from a light source 21 is converted by the anamorphic lens 22 into a light beam, which is parallel to the direction perpendicular to the rotational axis 12 and converges at a portion near the second reflection point on the deflective reflecting facet 11 relative to the direction parallel to the rotational axis 12, and is incident on the deflective reflecting facet 11 diagonally from below, in case of a drawing taken along the rotational axis 12, through the space 15 between the stationary plane mirrors 13 and 14. The light beam a0 becomes a light beam a1 after the first reflection by the deflective reflecting facet 11. The light beam a1 proceeds diagonally upward to be incident on one stationary plane mirror 13. The light beam a1 becomes a light beam a2 after reflection at the stationary plane mirror 13. The light beam a2 proceeds downward to be incident on the other stationary plane mirror 14. The light beam a2 becomes a light beam a3 after reflection at the stationary plane mirror 14. The light beam a3 is incident on the deflective reflecting facet 11 again. The light beam a3 becomes a light beam a4 after the second reflection by the deflective reflecting facet 11. The light beam a4 proceeds diagonally upward through the space 15 between the stationary plane mirrors 13 and 14 and is converted into a focused light beam via a scanning optical system 23 and is focused to be incident on an imaging surface 24. Since the deflective reflecting facets 11 revolve about the rotational axis 12, the focused light beam moves at a rotational speed about four times as faster as the rotational speed of the deflective reflecting facets 11 to write a scan line b on the imaging surface 24. Adjacent deflective reflecting facets 11 successively come in and go away the position of incidence of the incident light beam a0 because of the rotation of the polygon mirror 10. As a result, according to the rotation of the polygon mirror 10, the scan lines b are successively written from one end to the other end on the imaging surface 24 at the same level. The scanning in this direction is called the main scanning. Sub scanning is conducted by moving a scanned substrate on the imaging surface 24 in a direction perpendicular to that of the main scanning at a constant rate. The main scanning and the sub scanning cooperate to achieve raster scanning in which scan lines b are aligned with a constant pitch on the scanned substrate.

The two stationary plane mirrors 13, 14 are disposed perpendicularly to the incident plane on the condition that the incident plane is defined as a plane being parallel to the rotational axis 12 and including the central ray of the incident light beam a0.

Similarly to the optical scanning device of the first embodiment, the above description made with reference to FIG. 1 through FIG. 10 can be adopted to the optical scanning device of the second embodiment and the equations (1) through (20) are also adopted.

Figure 20:
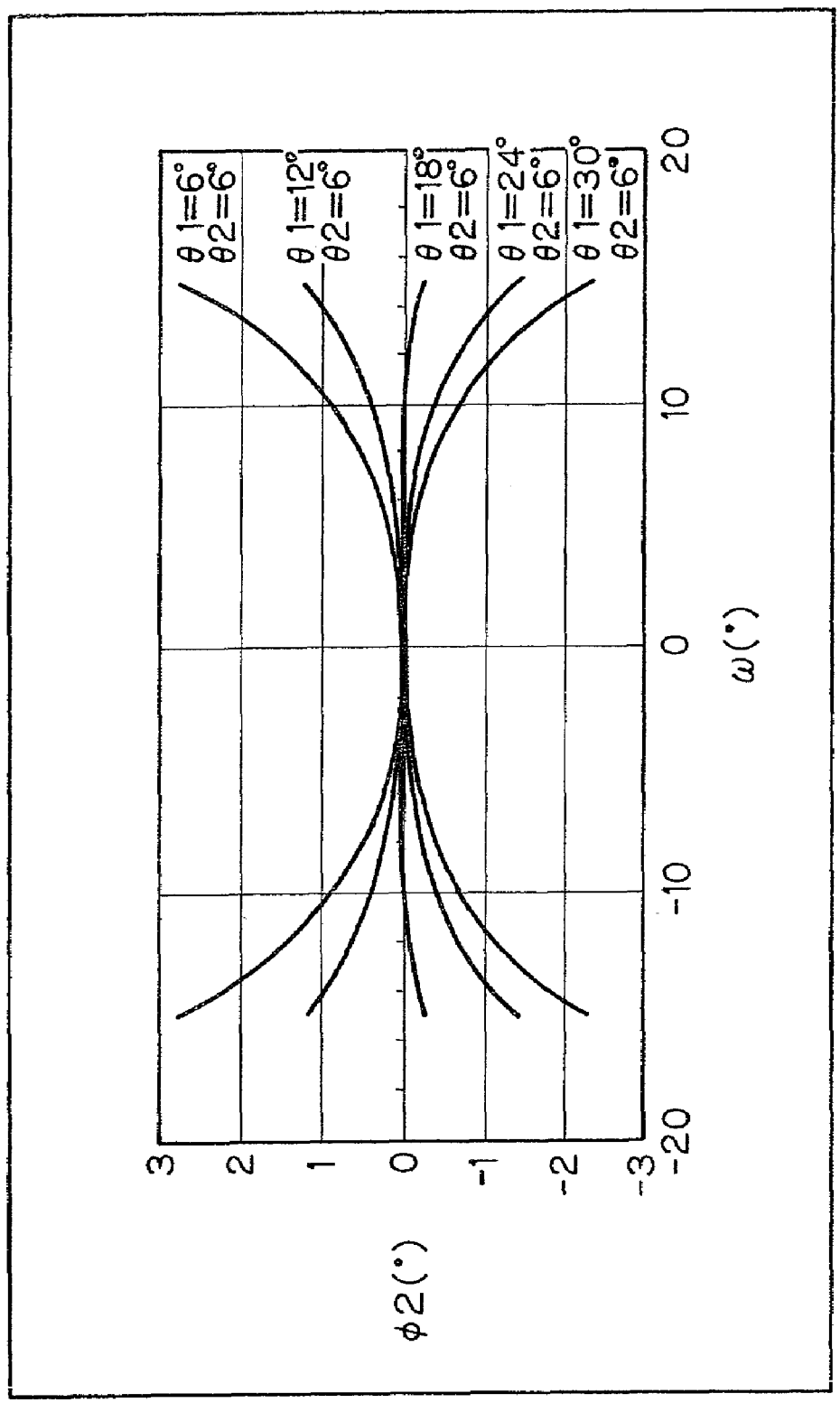
FIG. 20 is a graph plotting differences in exit angle $\phi 2$ relative to the rotational angle $\omega$ of the deflective reflecting facet caused by changing the ratio between $\theta 1$ and $\theta 2$.

FIG. 20 is a graph, as an example, plotting differences in exit angle $\Phi 2$ relative to the rotational angle $\omega$ of the deflective reflecting facet 11 caused by changing the ratio between $\theta 1$ and $\theta 2$ according to the equation (20). Except some special cases of ratio between $\theta 1$ and $\theta 2$, the absolute value of the difference in exit angle $\Phi 2$ increases as the deflective reflecting facet 11 is revolved from the facing forthright position ($\omega=0°$). That is, a curvature similar to that in FIG. 3 is produced also in scanning line trail of light beam a4 after the second reflection at the deflective reflecting facet 11.

As described above, the amount of curvature in scanning line trail of the light beam a4 after the second reflection at the deflective reflecting facet 11 can be minimized by setting the ratio between $\theta 1$ and $\theta 2$ into a range represented by the following equation (21):

$$0.33 \cdot \theta 1 \leq \theta 2 \leq 0.37 \cdot \theta 1 \quad (21)$$

FIGS. 21($a$), 21($b$) are illustrations showing the light beam a4 from the deflective reflecting facet 11 to an imaging surface 24 through the scanning optical system 23, the light beams a4 being illustrated in a state projected on an incident plane. In the incident plane, FIG. 21($a$) is a case when the scanning optical system 23 is disposed such that the second deflection point P2 on the deflective reflecting facet 11 is substantially conjugated to the imaging surface 24 and FIG. 21($b$) is a case when the scanning optical system 23 is disposed, for example in front of the focal point, such that the second deflection point P2 is not conjugated to the imaging surface 24. In FIGS. 21($a$), 21($b$), the emergent light beam a4 indicated by solid lines is the emergent light beam a4 when the deflective reflecting facet 11 faces forthright and the emergent light beam a4 indicated by broken lines is the emergent light beam a4 when the deflective reflecting facet 11 is revolved by a rotational angle $\omega$ from the facing forthright position.

As described above, in the deflective optical system in which an incident light beam is reflected by two stationary plane mirrors sequentially so that the light beam is incident twice on the same deflective reflecting facet to deflect the light beam, there is no necessary to provide an optical system for correcting the tilt error. However, unless the light beam a3 is incident on the deflective reflection facet 11 at the second deflection point P2 at an angle not perpendicular to the sub scanning direction ($\theta 2 \neq 0°$), a difference in exit angle $\Phi 2$ as mentioned above must be generated so as to cause curvature in scanning line trail. As shown in FIG. 21($b$), the scanning optical system 23 is disposed such that the second deflection point P2 on the deflective reflecting facet 11 is not conjugated to the imaging surface 24. The position in the sub scanning direction of the emergent light beam a4 converging on the imaging surface 24 varies according to the rotational angle $\omega$ so as to cause a curvature in scanning line.

To solve this problem, in the second embodiment of the present invention as shown in FIG. 21($a$), the scanning optical system 23 is disposed in such a manner that the second deflection point P2 on the deflective reflecting facet 11 is substantially conjugated to the imaging surface 24 and the anamorphic lens 22 (FIG. 1) is disposed in optical path in such a manner that a light beam from the light source 21 converges at a portion near the second deflection point P2 in the sub scanning direction parallel to the rotational axis 12. The lens 22 may be composed of an optical system as a combination of a collimator lens which is rotational symmetric and a cylindrical lens having conversing effect only in the sub scanning direction can be used instead of the anamorphic lens 22. As the scanning optical system 23 is disposed in such a manner that the second deflection point P2 on the deflective reflecting facet 11 is substantially conjugated to the imaging surface 24, the position in the sub scanning direction of the emergent light beam a4 converging on the imaging surface 24 does not move even with variation of rotational angle ω. Therefore, even when the scanning line trail is curved due to the difference in exit angle φ2, no curvature in scanning line is caused so as to create a substantially straight scanning line b on the imaging surface 24.

Figure 22A:
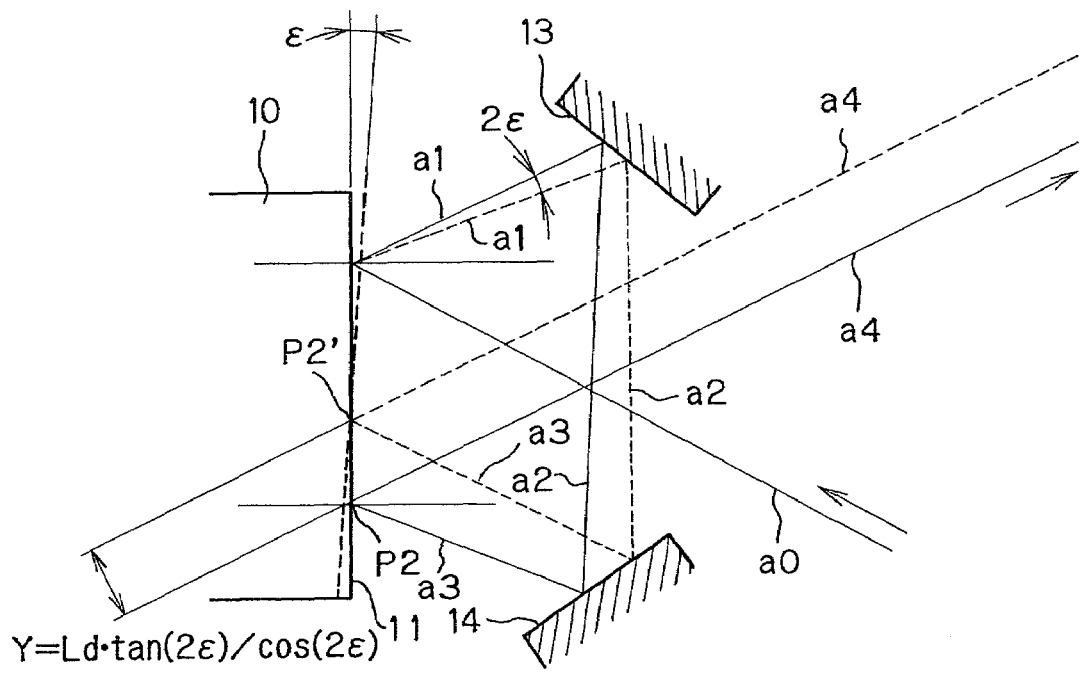
FIGS. 22(a), 22(b) are auxiliary illustrations similar to FIG. 5 but showing a case where surface tilt error is caused on the deflective reflecting facet.
Figure 22B:
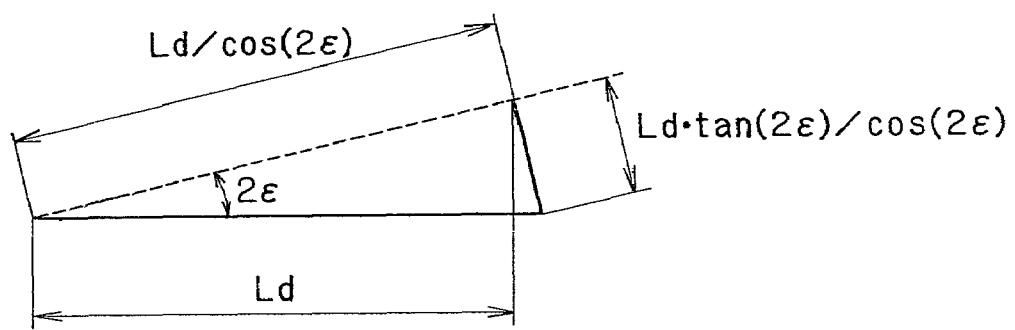
Figure 23:
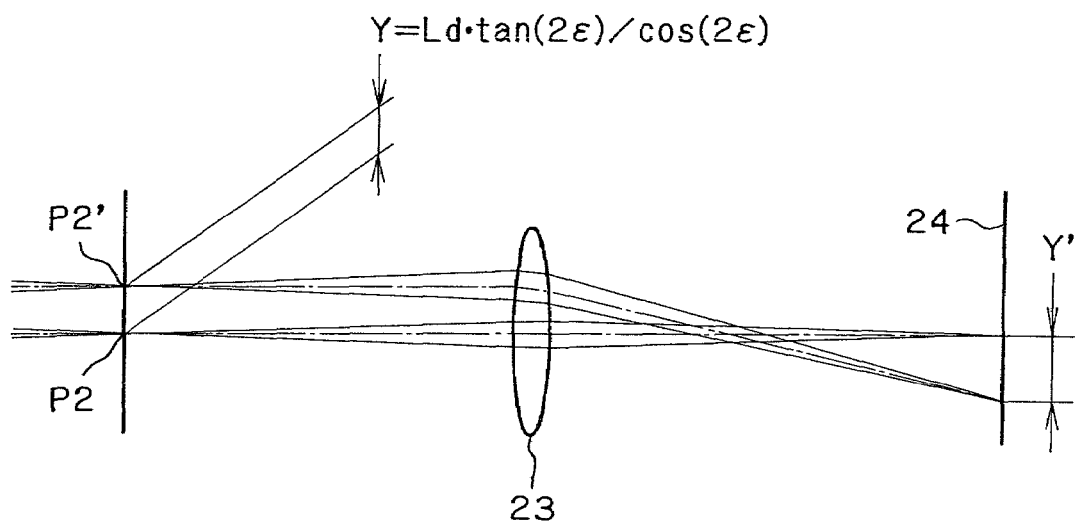
FIG. 23 is an illustration for explaining the movement of scanning line on the imaging surface when there is a movement at the second deflection point.

FIG. 22(a) is an illustration similar to FIG. 5, but showing a case where the deflective reflecting facet 11 has a surface tilt error by an angle ε. Solid lines indicate a case where there is no surface tilt error and broken lines indicate a case where there is a surface tilt error by an angle ε. Even when the deflective reflecting facet 11 has a surface tilt error, the emergent light beam a4 projected on the incident plane moves just in parallel while the second deflection point on the deflective reflection facet 11 moves from P2 to P2'. With reference to FIG. 22(b) as an auxiliary drawing, the moving amount Y is given by:

$$Y = Ld \cdot \tan(2\epsilon)/\cos(2\epsilon) \tag{28}$$

where Ld is the transfer distance from the first deflection point to the second deflection point when the emergent light beam a4 is on the incident plane. Assuming that the second deflection point on the deflective reflection facet 11 moves the above amount, the scanning line b moves a distance Y' by the focusing at the second reflection point in the sub scanning direction of the scanning optical system 23. The distance Y' is given by:

$$Y = \beta \cdot Ld \cdot \tan(2\epsilon)/\cos(2\epsilon) \tag{29}$$

where β is the transverse magnification in the sub scanning direction of the scanning optical system 23.

The distance Y' is a displacement of the scanning line on the imaging surface 24 due to the surface tilt error of the deflective reflecting facet 11 at the second deflection point. Therefore, the displacement must be about ¼ or less of the scanning line pitch LP in case of a monochrome electrophotographic apparatus in which half tone in densities is not important and about ⅛ or less of the scanning line pitch LP in case of color electrophotographic apparatus in which half tone in densities is important. Taking these into consideration, it is required to satisfy the following equation:

for the monochrome electrophotographic apparatus, $$|\beta \cdot Ld \cdot \tan(2\epsilon)/\cos(2\epsilon)| \leq 0.25 \cdot LP \tag{30}$$

for the color electrophotographic apparatus, $$|\beta \cdot Ld \cdot \tan(2\epsilon)/\cos(2\epsilon)| \leq 0.125 \cdot LP \tag{31}$$

Figure 24:
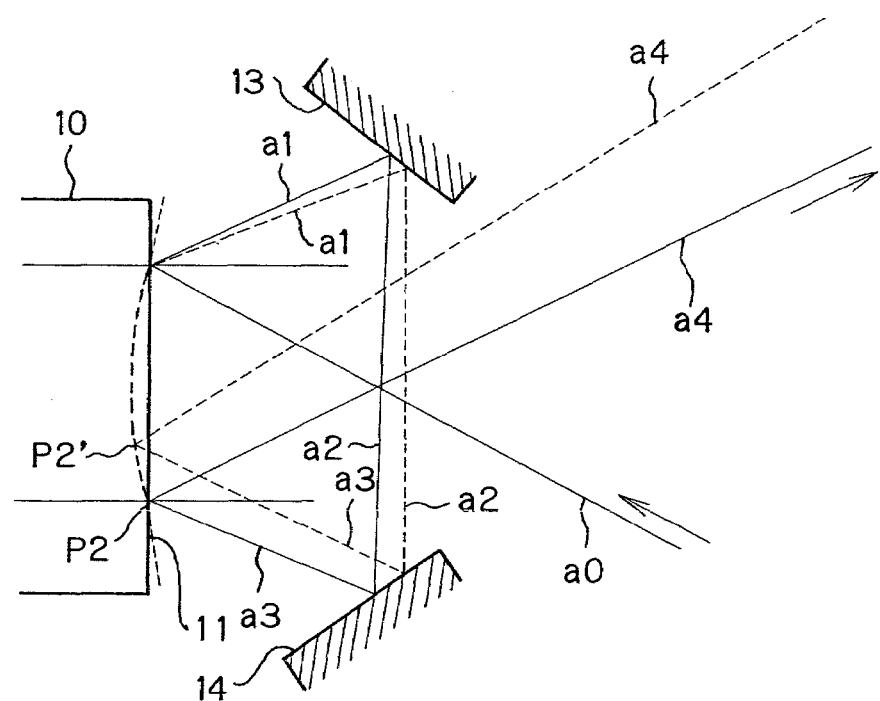
FIG. 24 is an illustration showing a state of an emergent light beam a4 when the deflective reflecting facet has a twisted or curved portion.

By the way, as shown in FIG. 24, when the deflective reflecting facet 11 is not a right plane as shown by a solid line and is twisted or curved as shown by a broken line, the emergent light beam a4 as projected on the incident plane moves not in parallel as shown in FIG. 22(a) but at an angle to the emergent light beam a4 when the deflective reflecting facet is a right plane. The difference in exit angle causes curvature in scanning line trail. Further, if the degree of twist or the degree of curvature varies every deflective reflecting facet, the angle to the emergent light beam a4 when the deflective reflecting facet 11 is a right plane also varies every deflective reflecting facet 11. The variation of the exit angle causes variation in the position of the scanning line trail in the sub scanning direction.

Like the second embodiment of the present invention, however, by disposing the scanning optical system 23 in such a manner that the second deflection point P2 on the deflective reflecting facet 11 is substantially conjugated to the imaging surface 24 and by disposing the anamorphic lens 22 (FIG. 1) in optical path in such a manner that a light beam from the light source 21 converges at a portion near the second deflection point P2 in the sub scanning direction parallel to the rotational axis 12, the scanning line b on the imaging surface 24 can be substantially straight even when the deflective reflecting facet has twist and/or curvature. There is also such an effect that, even when the degree of twist or the degree of curvature varies every deflective reflecting facet, the scanning line distortion of the scanning line b formed by emergent light beam a4 converged on the imaging surface 24 can be corrected.

Figure 21A:
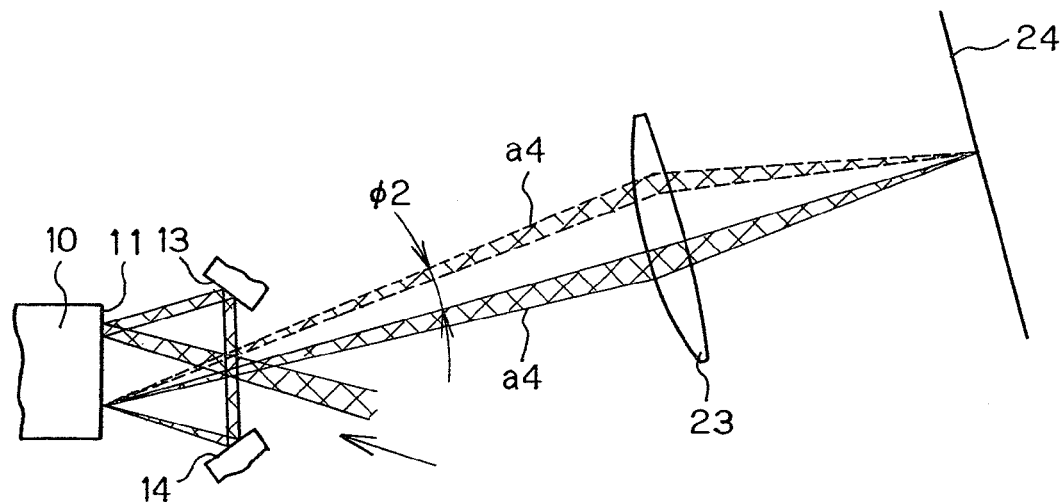
FIGS. 21(a), 21(b) are illustrations for explaining the optical scanning device according to the second embodiment of the present invention and showing light beams a4 from a deflective reflecting facet to an imaging surface through the scanning optical system, the light beams a4 being illustrated in a state projected on an incident plane.
Figure 21B:
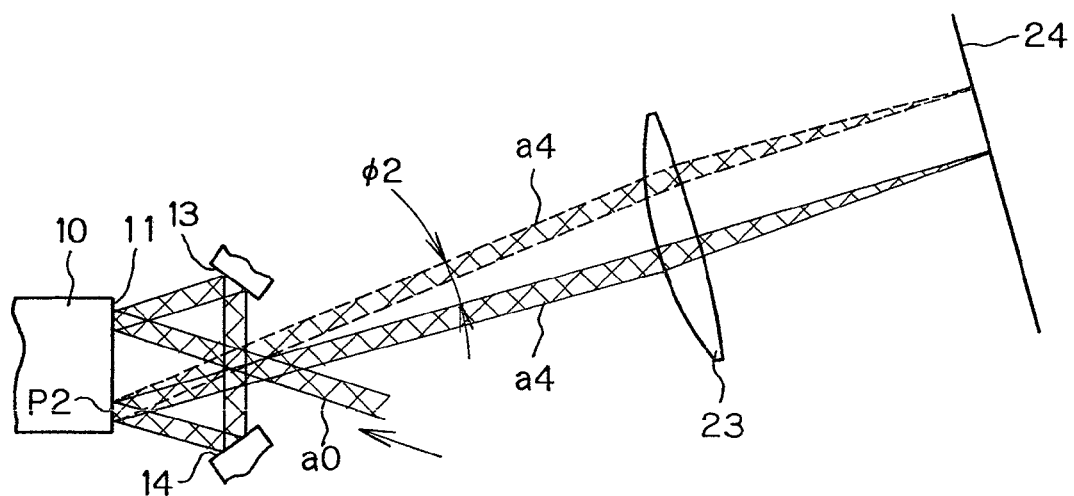
Figure 25A:
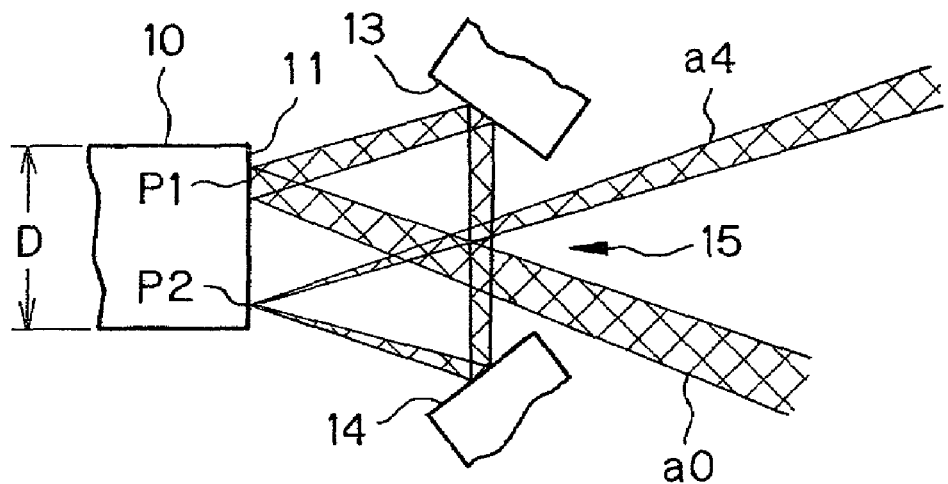
FIGS. 25(a), 25(b) are illustrations for explaining that the thickness of a polygon mirror can be reduced according to the optical scanning device according to the second embodiment of the present invention.
Figure 25B:
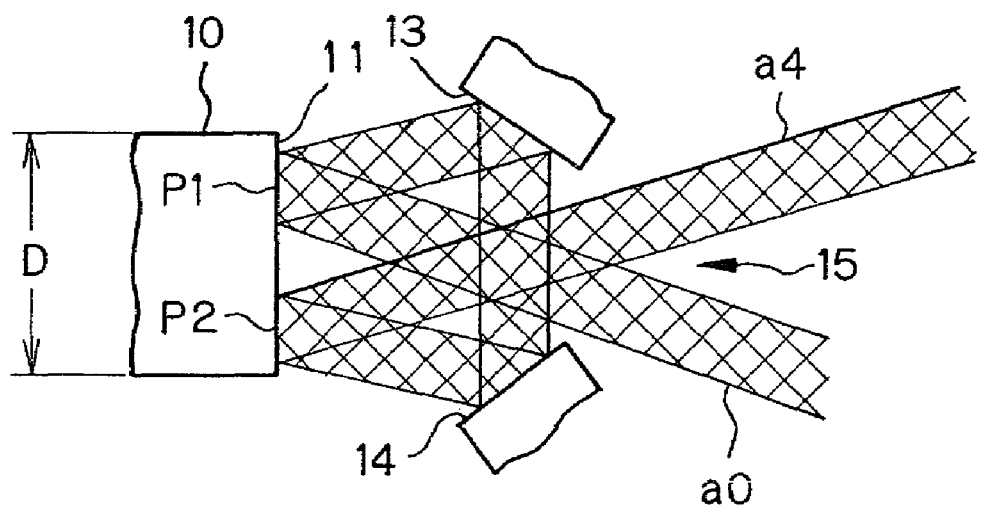

FIGS. 25(a), 25(b) are illustrations in which incident light beam a0 and the emergent light beam a4 are projected on the incident plane near the polygon mirror 10, corresponding to FIGS. 21(a), 21(b), respectively. In case that the second deflection point P2 on the deflective reflecting facet 11 is set to be substantially conjugated to the imaging surface 24 as shown in FIG. 25(a), the light beams a0 and a4 passing through the space 15 between the stationary plane mirrors 13 and 14 have reduced beam diameter in the sub scanning direction because of the convergence near the space 15. On the other hand, in case that the second deflection point P2 on the deflective reflecting facet 11 is set not to be conjugated to the imaging surface 24, the light beams a0 and a4 passing through the space 15 between the stationary plane mirrors 13 and 14 have not reduced beam diameter (thick relative to the beam diameter of the above case) as shown in FIG. 25(b). Therefore, in the second embodiment of the present invention shown in FIG. 25(a), the distance between the first deflection point P1 and the second deflection point P2 on the deflective reflecting facet 11 can be reduced by disposing the stationary plane mirrors 13 and 14 at positions nearer to the polygon mirror 10. In addition, since the converged point in the sub scanning direction is positioned near the deflective reflecting facet 11, the beam diameter in the sub scanning direction is reduced. Therefore, the second embodiment of the present invention shown in FIG. 25(a) allows reduction in the thickness D of the polygon mirror 10 in the direction of the rotational axis 12, thereby providing advantages of reducing the size and the cost of the optical scanning device.

Further, since the light deflective optical system is structured such that the light beam a0 is incident on the deflective reflecting facet 11 from the illumination optical system through the space 15 between the two stationary plane mirrors 13 and 14 and the light beam a4 exits through the space 15, there is no limitation on the size opposite to the space 15 between the stationary plane mirrors 13 and 14. Therefore, the transfer distance between the first deflective point P1 and the second deflective point P2 can be shortened without using mirrors each of which has a highly accurate and very small reflecting surface requiring difficult process and which is thus expensive.

Though the above description was made for a case that the polygon mirror (rotary polygonal mirror) is employed as the deflective reflecting facet 11, the aforementioned effects can be exhibited even in a case that a swiveling galvanometer mirror is employed.

Though the principle and embodiments of the optical scanning device according to the present invention have been described in the above, the present invention is not limited thereto and various modifications may be made.

Figure 26:
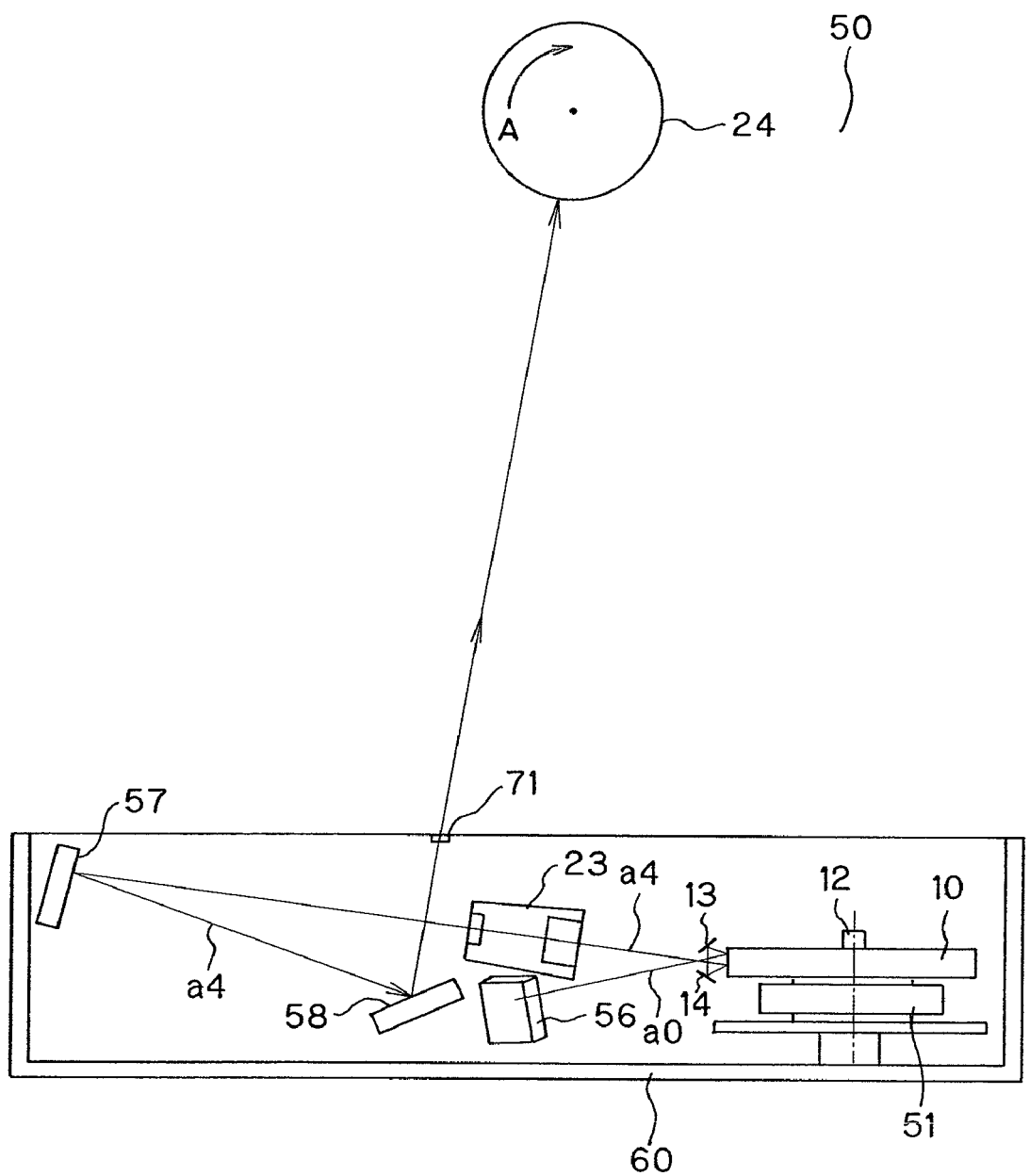
FIG. 26 is an explanatory illustration showing an example of the optical scanning device.

FIG. 26 is an explanatory view showing an example of the optical scanning device 50 as described above. In FIG. 26, a light beam a0 outputted from a light source (not shown) is reflected by a reflective mirror 56 so that the light beam a0 is incident on a rotary polygonal mirror 10 diagonally upwardly not in a direction perpendicular to a rotational axis 12 of the rotary polygonal mirror 10.

The incident light beam a0 into the rotary polygonal mirror 10 is reflected at a deflective reflecting facet 11 to proceed diagonally upwardly as a deflected light beam a4 in the drawing. The deflected light beam a4 is incident on a reflective mirror 57 via the scanning optical system (image formation lens) 23.

The incoming beam into the reflective mirror 57 is reflected to proceed diagonally downwardly to the right in the drawing toward a second reflective mirror 58 positioned on the deflective reflecting facet side and is reflected at the second reflective mirror 58 to proceed upwardly in the drawing. The light beam proceeding upwardly is incident on an imaging surface 24 such as a photoreceptor drum which rotates in the direction of arrow A. The light beam into the imaging surface 24 writes a scanning line in a direction perpendicular to the direction of paper of the drawing.

Numeral 51 designates a driving motor for the rotary polygonal mirror 10 and numeral 60 designates a body frame supporting the rotary polygonal mirror 10, the driving motor 51, the scanning optical system (image formation lens) 23, and the reflective mirrors 56 through 58. Numeral 71 designates a cover glass mounted portion to which a cover glass for permitting the transmission of scanning beam is mounted.

Figure 45:
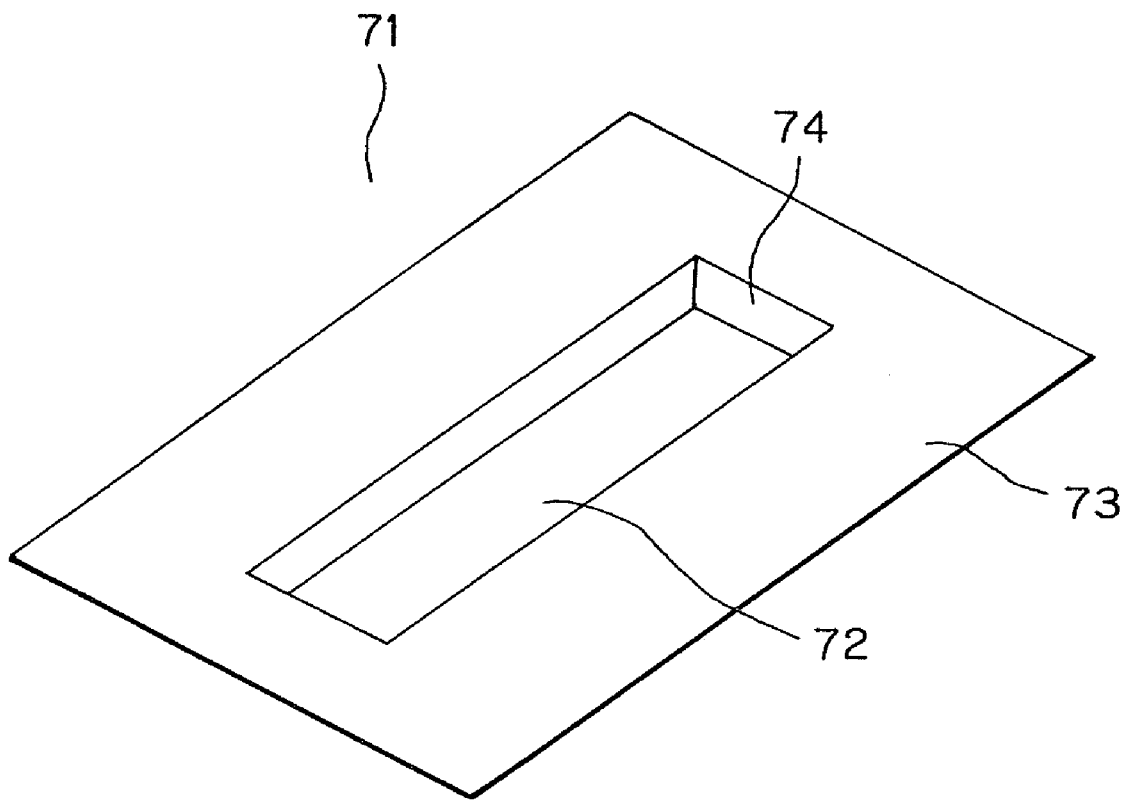
FIG. 45 is a perspective view schematically showing an example of a portion where a conventional cover glass is installed.

FIG. 45 is a schematic perspective view showing an example of the cover glass mounted portion 71. In FIG. 45, the cover glass 72 is mounted to a mounting member 73 via a frame 74. The reason why the cover glass 72 is positioned in a recess relative to the mounting member 73 is that the cover glass 72 is prevented from being damaged by contact with other members.

In addition, another reason is that the possibility that an operator contaminates the surface of the cover glass by touching with hands is reduced. The surface of the cover glass is cleaned by a cleaning member exclusively for the cover glass in order to prevent the transmission of light being blocked due to adhesion of dust and dirt. In the optical scanning system having the cover glass for permitting the transmission of light from the optical system to the imaging surface, the cover glass cleaning mechanism is provided between the optical system for light scanning and the imaging surface.

As mentioned above, the cover glass 72 is disposed in the recess formed by the frame 74 at a level lower than the surface of the mounting member 73. Therefore, after dust and dirt adhering to the surface of the cover glass 72 are wiped with the cleaning member, the dust and dirt still remain in the frame 74. That is, there is a problem that it is impossible to effectively clean the cover glass 72.

Figure 27:
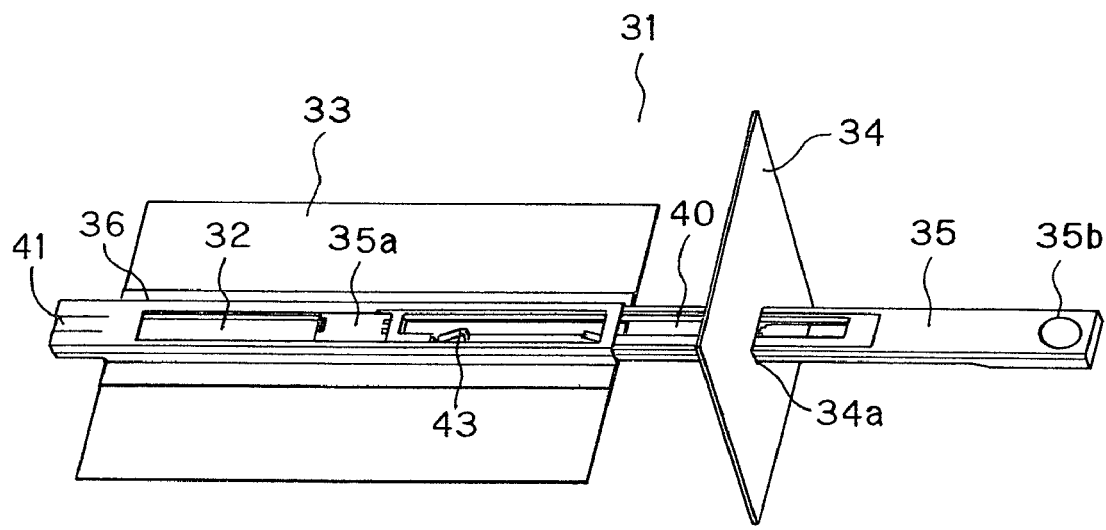
FIG. 27 is a schematic perspective view showing an example of a cover glass cleaning mechanism for the optical scanning device according to the present invention.

With reference to some drawings, a cover glass cleaning mechanism for an optical scanning device according to the present invention will be described. FIG. 27 is a schematic perspective view showing a cover glass cleaning mechanism according to an embodiment of the present invention. In FIG. 27, the cover glass cleaning mechanism 31 has a structure that a cover glass 32 is disposed to project on a mounting member 33 (see FIGS. 30(a), 30(b)).

Figures 30A, 30B:
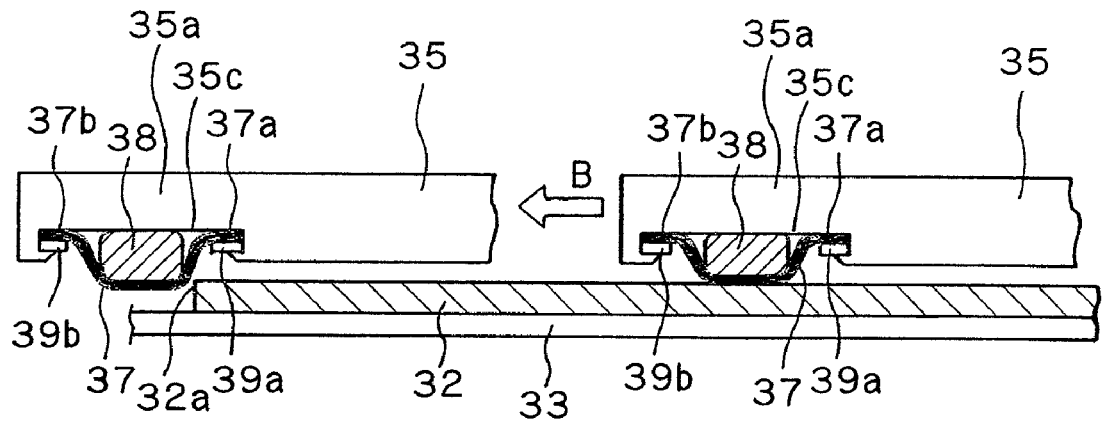
FIGS. 30(a), 30(b) are sectional front views partially and schematically showing the cover glass cleaning mechanism.

A guide member 36 is mounted on the mounting member 33 and has a structure that a cleaning lever 35 can reciprocate within the guide member 36. The cleaning lever 35 is provided at its distal end 35a with a cleaning member 37 and a cushion member 38 as shown in FIGS. 30(a), 30(b). Numeral 35b designates a proximal end of the cleaning lever 35.

Numeral 34 partially indicates the side wall of the body frame. The side wall has an opening 34a through which the cleaning lever 35 can move. Numeral 41 designates a convex portion for retaining the cleaning lever 35 and numeral 43 designates a stopper for preventing the cleaning lever 35 from coming off. The details of the convex portion 41 and the stopper 43 will be described later.

Figure 28:
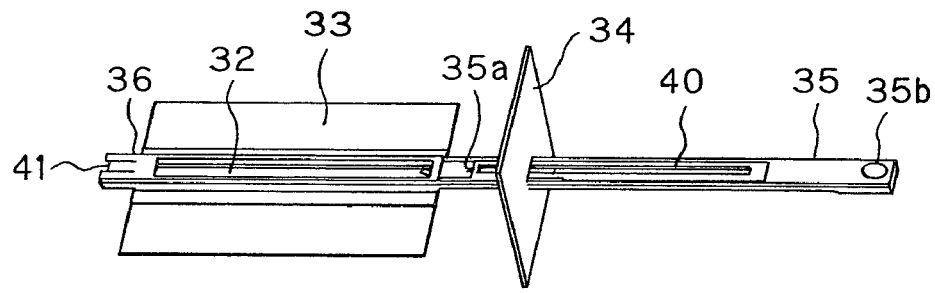
FIG. 28 is a perspective view showing a state that a cleaning lever shown in FIG. 27 is withdrawn.
Figure 29:
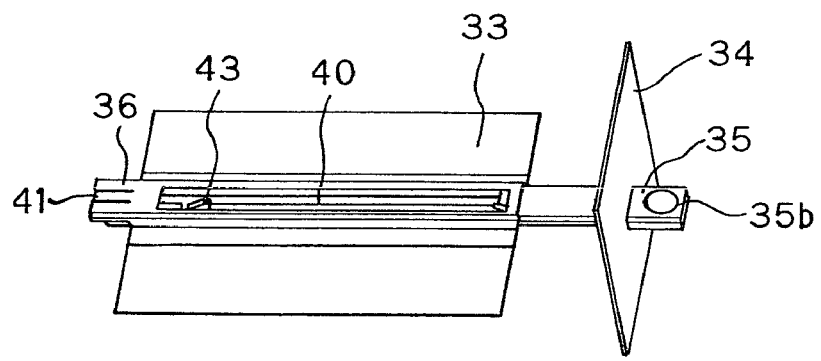
FIG. 29 is a perspective view showing a state that the cleaning lever shown in FIG. 27 is retracted.

FIG. 28 is a schematic perspective view showing a state that the distal end 35a of the cleaning lever 35 is withdrawn to the position of the body frame 34. FIG. 29 is a schematic perspective view showing a state that the proximal end 35b is brought to the position of the body frame 34 by pushing the cleaning lever 35 along the guide member 36.

FIGS. 30(a), 30(b) are schematic sectional front views partially showing the cover glass cleaning mechanism. FIG. 30(b) shows a state that the cleaning member 37 is on the cover glass 32. FIG. 30(a) shows a state that the cleaning lever 35 is out of the cover glass 32 as a result of that the cleaning lever 35 proceeds in the direction of arrow B.

The cleaning member 37 has flanges 37a, 37b formed on the both sides. The flanges 37a, 37b are engaged with retaining members 39a, 39b attached to the distal end 35a of the cleaning lever 35, thereby retaining the cleaning member 37. The cushion member 38 is accommodated between an inside concavity 35c of the cleaning lever 35 and the cleaning member 37.

As the cleaning lever 35 proceeds from the position shown in FIG. 30(b) in the direction of arrow B along the guide member (not shown), the cleaning member 37 removes dust and dirt adhering to the surface of the cover glass 32 with some pressure from the cushion member 38 so as to wipe the dust and dirt. As the cleaning member 37, artificial lather such as back skin having a raised surface can be used. Since the cleaning member 37 is pressed against the surface of the cover glass 32 by an elastic member such as the cushion member 38, dust and dirt adhering to the surface of the cover glass 32 can be effectively removed.

In the state that the cleaning lever 35 reaches the position shown in FIG. 30(a), that is, the position where the cleaning lever 35 is out of the cover glass, the cleaning member 37 is positioned at a level lower than the level of the surface of the cover glass 32 because of the elasticity of the cushion member 38. Consequently, the dist and dirt wiped off from the cover glass 32 and attached to the cleaning member 37 fall out of the cover glass 32.

In the present invention, the stroke distance of the cleaning lever 35 is set to be such a length that the cleaning member 37 accommodated in the concavity 35c formed in the distal end 35a reaches a position out of the end of the cover glass 32. According to this structure, after dust and dirt adhering to the surface of the cover glass are wiped by the cleaning member 37, the dust and dirt do not remain on the cover glass.

When the cleaning lever 35 is returned to the initial position, the cleaning member 37 is put on the cover glass 32 via the end edge 32a of the cover glass 32. Accordingly, even if dust and dirt remain on the cleaning member 37, the dust and dirt are efficiently scraped by the end edge 32a of the cover glass 32, whereby the surface of the cleaning member 37 can be maintained clean even after repeated cleaning operation. That is, according to the present invention, the stroke distance of the cleaning lever 35 is set to allow the movement of the cleaning member at the position out of one of the ends of the cover glass.

Figure 31:
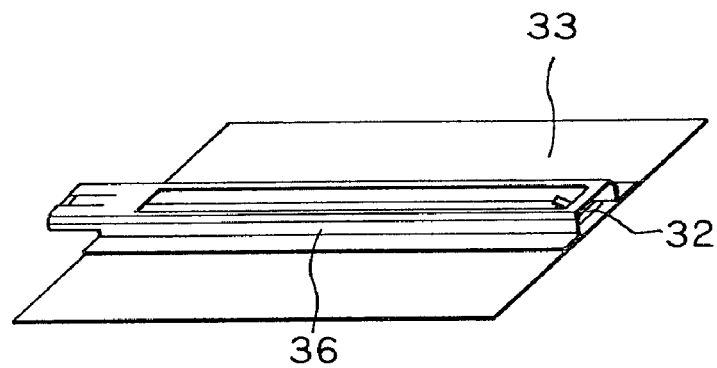
FIG. 31 is a perspective view schematically showing an embodiment of the present invention.

FIG. 31 is a schematic perspective view showing a state that the guide member 36 for the cleaning lever 35 is mounted on the mounting member 33. The guide member 36 has a function of keeping the accuracy of position between the cover glass 32 and the cleaning mechanism high by retaining the cleaning lever 35 not to shift vertically or laterally from the normal position on the cover glass. Since the guide member 36 is arranged above the cover glass 32, the guide member 36 also has a function of preventing the cover glass from being contaminated by hands of an operator or adhesion of foreign matter.

Figure 32:
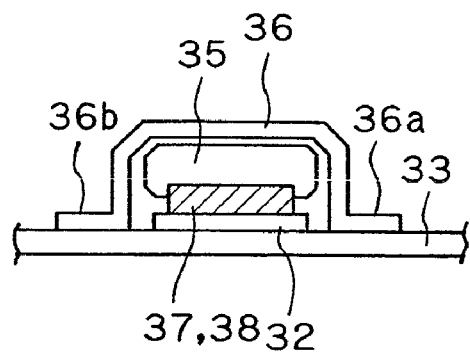
FIG. 32 is a cross sectional view schematically showing an example of a guide member.

FIG. 32 is a schematic cross sectional view showing an example of the guide member 36. As shown in FIG. 32, the guide member 36 is formed in an arch shape so as to cover the cover glass 32 and has legs 36a, 36b which are fixed to the mounting member 33. The guide member 36 extends over the entire length of the cover glass 32. The cleaning lever 35 reciprocates parallel to the cover glass 32 along the inner space formed in the arch shape of the guide member 36. Therefore, the cleaning member 37 is pressed against the cover glass 32 with constant pressure, thereby properly cleaning the cover glass 32 uniformly without remaining non-cleaned portions.

Accordingly, there is an advantage that the cleaning member 37 does not shift vertically or laterally from the normal position on the cover glass 32 so that the accuracy of position between the cleaning member 37 and the cover glass 32 can be maintained high. Since the cleaning lever 35 is retained by the guide member 36 extending over the entire length of the cover glass 32, the cleaning member 37 can be prevented from coming off the cleaning lever 35 and thus prevented from being contaminated by touching portions other than the cover glass 32.

Figure 33:
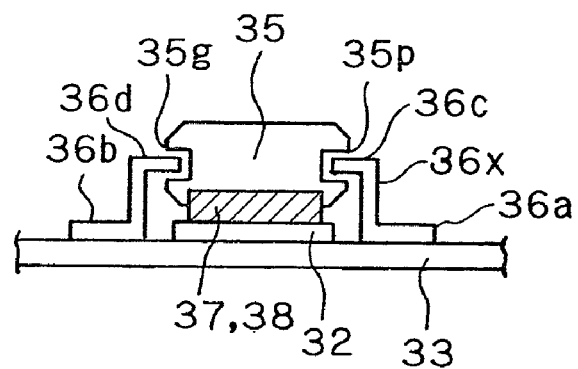
FIG. 33 is a cross sectional view schematically showing another example of the guide member.

FIG. 33 is a schematic cross sectional view showing an example of the guide member 36 according to another embodiment. As shown in FIG. 33, a guide member 36X has projections 36c, 36d above and on the both sides of the cover glass 32. A cleaning lever 35 has grooves 35p, 35q formed in the both side surfaces thereof. The grooves 35p, 35q are fitted with the projections 36c, 36d of the guide member 36X, thereby limiting the position of the cleaning lever 35 from unnecessarily shifting. This example also can maintain the accuracy of position between the cleaning member 37 and the cover glass 32 high.

Figure 34:
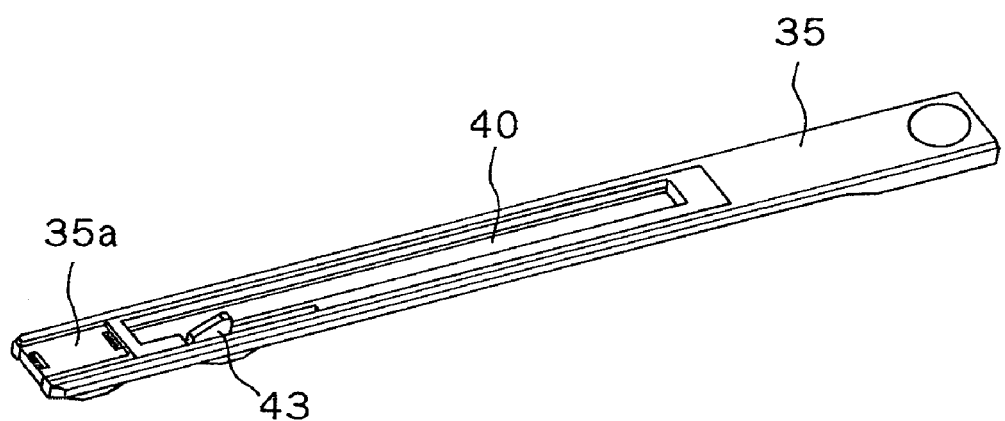
FIG. 34 is a perspective view schematically showing a cleaning lever according to the embodiment of the present invention.

FIG. 34 is a schematic perspective view showing a cleaning lever 35 according to an embodiment of the present invention. In FIG. 34, the cleaning lever 35 is provided at the center with a slot which is long in the longitudinal direction. The slot functions as a scanning light window 40. The scanning light window 40 permits the transmission of light beams to be incident on a photoreceptor drum so as to allow image formation even when the cleaning lever 35 is fully retracted inside as shown in FIG. 29.

Since the optical scanning device is always available even in a state that the cleaning lever 35 is attached, there is no need to detach and store the cleaning lever 35, thereby preventing the cleaning lever 35 from being missing and further preventing a storing place from being contaminated by the cleaning lever 35.

Figure 35:
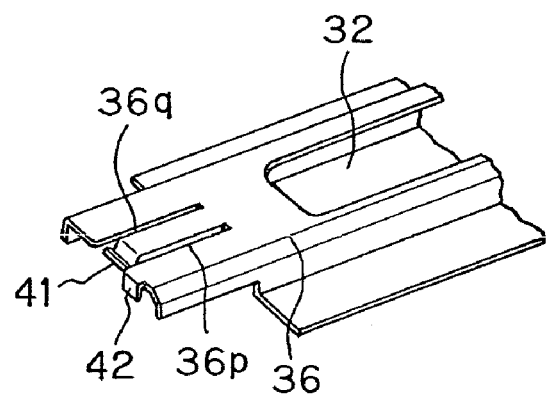
FIG. 35 is a perspective view partially and schematically showing one end in the longitudinal direction of the guide member.

FIG. 35 is a schematic perspective view partially showing one of the ends in the longitudinal direction of the guide member 36. In FIG. 35, the end in the longitudinal direction of the guide member 36 is provided with cutting grooves 36p, 36q which are parallel to each other. The end of a portion between the cutting grooves 36p and 36q is deformed by bending process so as to form a convex portion 41. The end of the guide member 36 is formed with a bent portion 42 having an L-like section.

Figure 36:
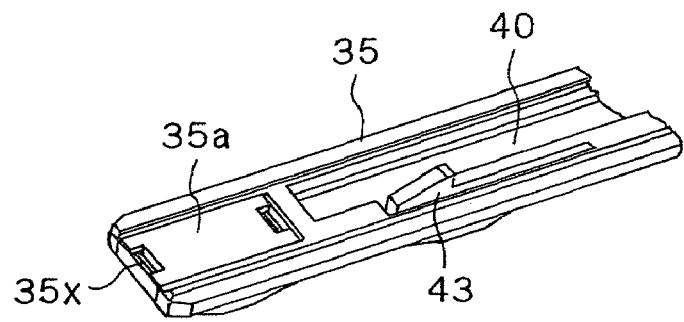
FIG. 36 is a perspective view partially and schematically showing one end in the longitudinal direction of the cleaning lever.

FIG. 36 is a schematic perspective view partially showing one of the ends in the longitudinal direction of the cleaning lever 35. In FIG. 35, the cleaning lever 35 is provided with a concave portion 35x at the one end 35a in the longitudinal direction of the cleaning lever 35. The concave portion 35x is formed at such a position that the concave portion 35x confronts the convex portion 41 formed at the end of the guide member 36 mentioned above when the cleaning lever 35 is fully retracted inside and thus functions as a movement restriction means.

Figure 37:
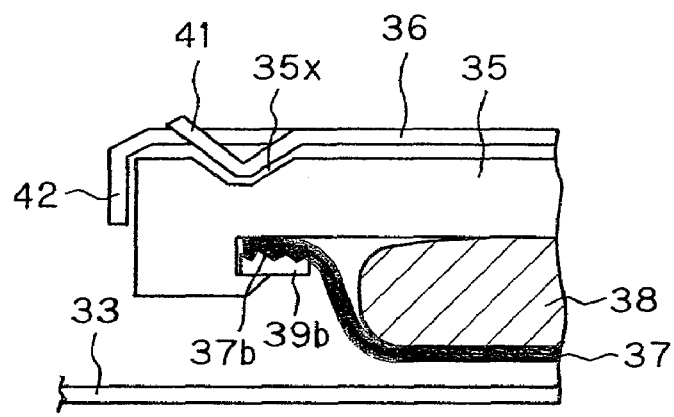
FIG. 37 is a vertical sectional front view partially showing an embodiment of the present invention.

FIG. 37 is a sectional front view partially showing the relation between the guide member 36 and the cleaning lever 35 when the cleaning lever 35 is fully retracted. In this example, the cleaning member 37 is shown in a state positioned out of the end of the cover glass 32. As shown in FIG. 37, the convex portion 41 formed in the guide member 36 is engaged with the concave portion 35x formed in the cleaning lever 35 so as to stop the cleaning lever 35 from unnecessarily moving when the cleaning lever 35 is retracted inside.

This structure can prevent such an event that dust and dirt attached to the cleaning member 37 fly to the surface of the cover glass 32 due to vibration of the cleaning lever 35. In addition, the engaging means composed of the aforementioned concave and convex portions also functions as a click mechanism so that an operator can sensuously check when the cleaning lever 35 reaches the traveling terminal position during pushing the cleaning lever 35.

The guide member 36 is provided at its end with a bent portion 42 having an L-like section which functions as a stopping member which stops the further movement of the cleaning lever 35 at the terminal end so as to conduct the movement restriction, thereby preventing the excessive movement of the cleaning lever 35. Therefore, the economical movement of the cleaning lever 35 can be achieved.

The end 37b of the cleaning member 37 and the retaining member 39b are both provided with saw teeth which mesh with each other, thereby securely retaining the cleaning member 37.

Figure 38:
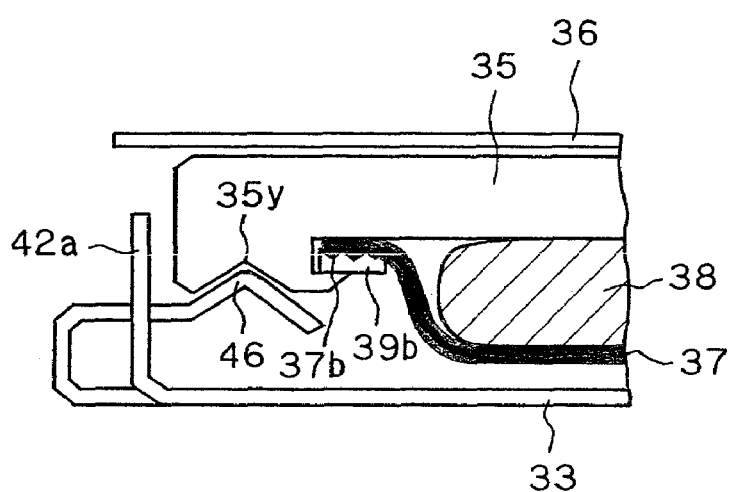
FIG. 38 is a vertical sectional front view partially showing an embodiment of the present invention.

FIG. 38 is a sectional front view similar to FIG. 37, but showing another embodiment. Only different points from the embodiment of FIG. 37 will be described. In the embodiment of FIG. 38, a mounting member 33 is provided with a convex portion 46. The cleaning lever 35 is provided with a concave portion 35y, as a movement restriction means, at a position corresponding to the convex portion 46 such that the concave portion 35y and the convex portion 46 can be engaged with each other.

In the present invention, it is possible to form the movement restriction means in the cleaning lever and to form the engaging means in the guide member, but not shown. It is also possible to form the movement restriction means in the cleaning lever and to form the engagement means in the mounting member for the cover glass.

The mounting member 33 is provided at the end with a bent portion 42a functioning as a stopping member for limiting the terminal end of the cleaning lever 35. In the embodiment of FIG. 38, the mounting member 33 is structured to function as a cover for a laser scanning unit (LSU), thereby reducing the number of parts.

Figure 39:
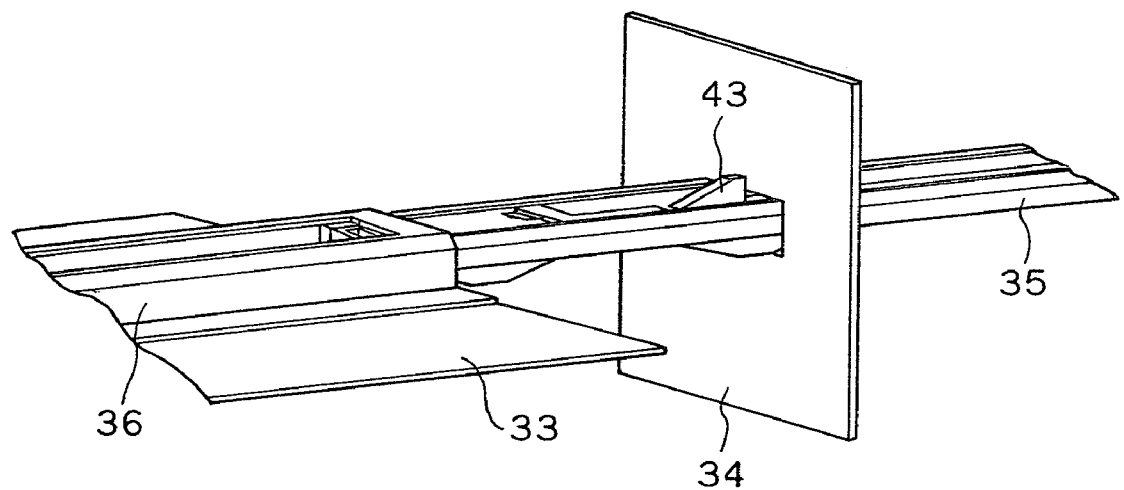
FIG. 39 is a perspective view schematically showing an embodiment of the present invention.
Figure 40:
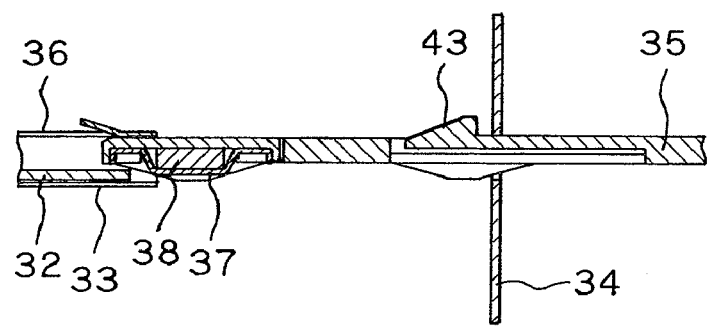
FIG. 40 is a vertical sectional front view schematically showing the embodiment shown in FIG. 39.

FIG. 39 is a schematic perspective view showing an embodiment of the present invention and FIG. 40 is a schematic cross sectional front view of the embodiment of FIG. 39. In FIG. 39 and FIG. 40, a cleaning lever 35 is provided with a stopper 43 on the surface thereof. The stopper 43 comes in contact with the wall of the body frame 34 when the cleaning lever 35 is withdrawn, thereby preventing the cleaning lever 35 from coming off the guide member 36.

That is, as shown in FIG. 40, the cleaning member 37 moves to a position out of the proximal end (near the body frame 34) of the cover glass 32 by withdrawing the cleaning lever 35. In this state, the distal end of the cleaning lever 35 is positioned near the proximal end of the guide member 36 and, if the cleaning lever 35 is further withdrawn, it must come off the guide member 36.

In this case, it is required to align the cleaning lever 35 to the guide member 36 for the operation of pushing the cleaning lever 35 again, thus making the operation complex. However, the stopper 43 is formed in the cleaning lever 35. The movement of the cleaning lever 35 is restricted at the position of the body frame 34 by the stopper 43 so that the cleaning lever 35 never comes off the guide member 36. Therefore, the operation of pushing the cleaning lever 35 again is not troublesome, thus increasing the operability.

Figure 41:
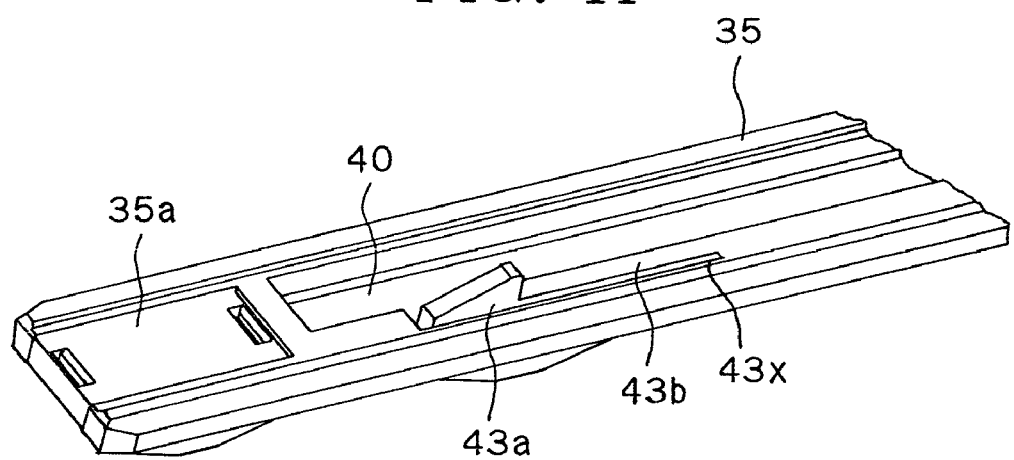
FIG. 41 is a perspective view showing the details of a stopper.
Figure 42:
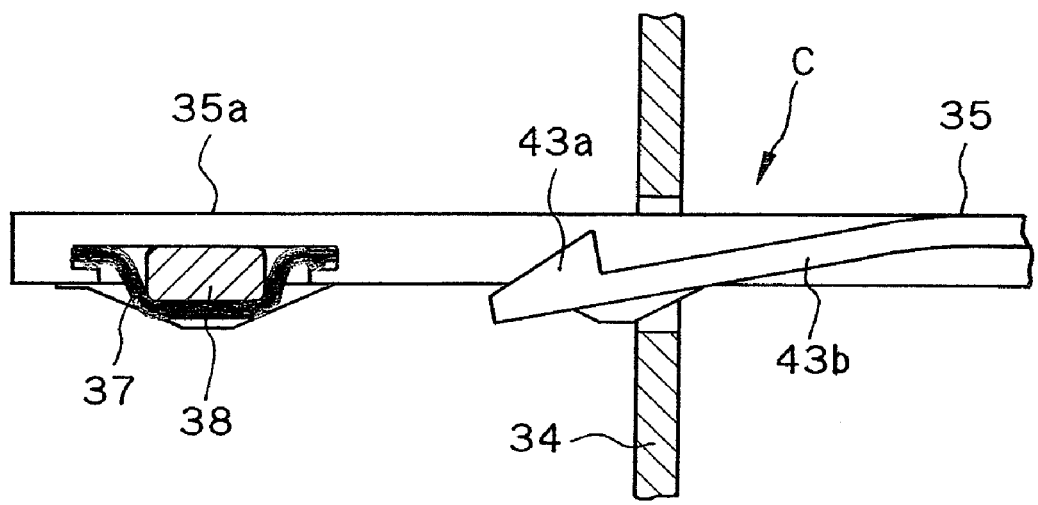
FIG. 42 is a vertical sectional front view schematically showing the action of the stopper.

FIG. 41 is a perspective view showing details of the stopper 43 and FIG. 42 is a schematic sectional front view showing the operation of the stopper 43. As shown in FIG. 41, a cutting groove 43x is formed in the surface of the cleaning lever 35 so as to form an elastic deformable portion 43b. The stopper 43 has a hook portion 43a formed on the end thereof.

The stopper 43 is provided with an elastic deformable portion 43b. Therefore, as shown in FIG. 42, the elastic deformable portion 43 can be pivotally moved in the direction of arrow C by pressing the elastic deformable portion 43, thereby allowing the hook portion 43a to come off the body frame 34. Therefore, the cleaning lever 35 can come off the end of the guide member 36 so that the cleaning lever 35 can be removed from the body of the optical scanning device.

Since the cleaning lever 35 is removable from the optical scanning device in this manner, the convenience in maintenance such as cleaning of the cleaning member 37 and the replacement of the cleaning member 37 with deterioration is improved.

Figure 43:
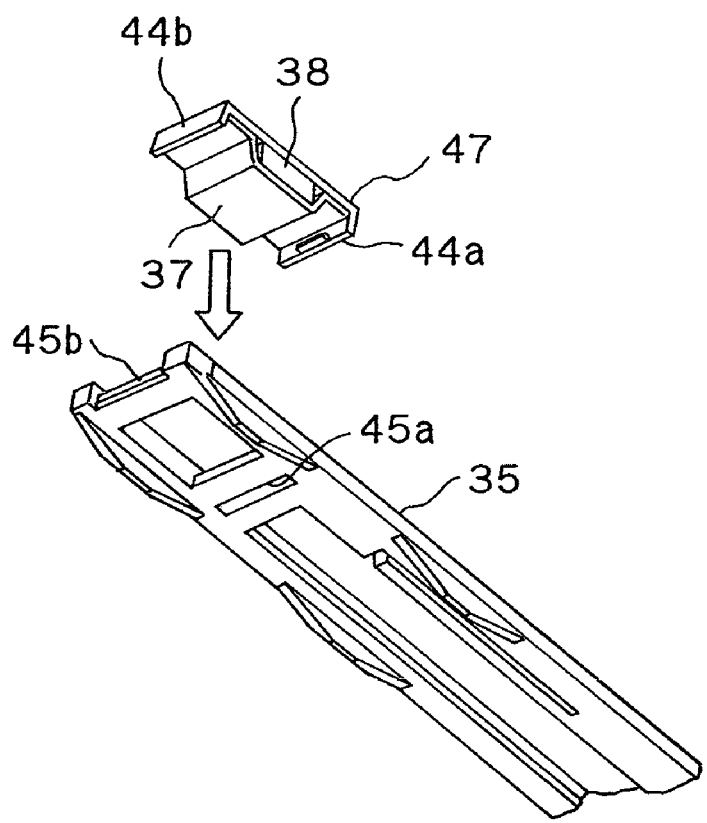
FIG. 43 is an exploded perspective view of a cleaning lever.
Figure 44:
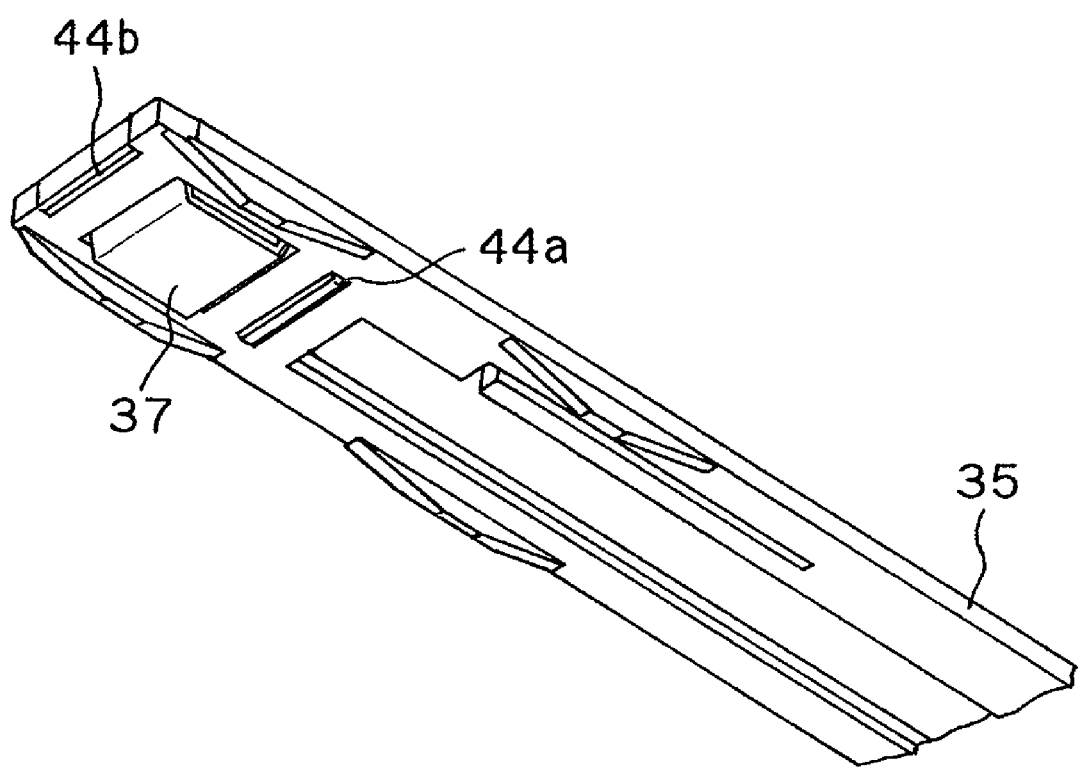
FIG. 44 is a schematic perspective view of the cleaning lever taken from below.

FIG. 43 is an exploded perspective view of the cleaning lever 35 and FIG. 44 is a schematic perspective view showing the cleaning lever 35 taken from below. As shown in FIG. 43, the cleaning member 37 and the cushion member 38 are attached to a holding plate 47. The both side ends of the holding plate 47 are bent to form legs 44a, 44b.

The cleaning lever 35 is provided with insertion holes 45a, 45b formed at positions corresponding to the legs 44a, 44b. The legs 44a, 44b of the holding plate 477 are inserted into the insertion holes 45a, 45b, respectively so that the cleaning member 37 projects from the bottom of the cleaning lever 35. Since the cleaning member 37 is detachably attached to the cleaning lever 35 as mentioned above, the inspection and the replacement of the cleaning member 37 can be easily conducted.

The above-described embodiments are only examples of embodiments. The present invention is not limited to the above-described embodiments and allows various modifications.

INDUSTRIAL APPLICABILITY

Apparent from the above description, according to the first through third optical scanning devices of the present invention, an optical scanning device employing a light deflective optical system of twice incidence type comprising a deflective reflecting facet and two stationary plane mirrors is characterized in that the central ray of an emergent light beam when the emergent light beam after the second reflection by the deflective reflecting facet is on the incident plane and a straight line as the central ray of an emergent light beam being projected on the incident plane when the deflective reflecting facet is revolved by the maximum rotational angle are set substantially parallel to each other, the equation (22) is satisfied, or the central ray of an emergent light beam when the emergent light beam after the second reflection by the deflective reflecting facet is on the incident plane and a straight line as the central ray of an emergent light beam being projected on the incident plane when the deflective reflecting facet is revolved by the maximum rotational angle intersect with each other at a position near at least one of optical surfaces disposed in the optical axial direction of a scanning optical system. Therefore, curvature in scanning line trail on the optical surface(s) in the scanning optical system is reduced or becomes substantially zero, thereby increasing the degree of freedom of position arrangement of the scanning optical system and allowing the reduction in dimension in the sub scanning direction of a scanning optical system, thus achieving an inexpensive scanning optical device which is small and has high accuracy.

According to the fourth optical scanning device of the present invention, an optical scanning device employing a light deflective optical system of twice incidence type comprising a deflective reflecting facet and two stationary plane mirrors is characterized in that an emergent light beam when the emergent light beam after the second reflection by said deflective reflecting facet is on the incident plane has such a relation that the second reflection point and the imaging surface are substantially conjugated to each other on the incident plane, whereby the position in the sub scanning direction of the emergent light beam converging on the imaging surface does not move even with variation of rotational angle of the deflective reflecting facet. Therefore, even when the scanning line trail is curved due to the difference in exit angle, no curvature in scanning line is caused so as to create a substantially straight scanning line on the imaging surface. In addition, even when there is difference in exit angle or variation in exit angle based on the twist or curvature of deflective reflecting facet, a substantially straight scanning line is created in the imaging surface, thereby preventing occurrence of variation in scanning line. The variation in scanning line due to surface tilt error of the deflective reflecting facet can be minimized. With employing inexpensive and highly accurate stationary plane mirrors, the dimension in the rotational axis direction of the deflective reflecting facet is reduced, thereby achieving the reduction in size and in cost of the optical scanning device.

According to the cover glass cleaning mechanism for an optical scanning device of the present invention, the cover glass cleaning mechanism for an optical scanning device is structured such that dust and dirt adhering to the surface of the cover glass can be securely removed.

What is claimed is:

1. A cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein said cover glass is disposed to project on a mounting member, and the stroke length of said cleaning lever is set such that said cleaning member can be moved to a position out of the end of the cover glass on at least one of ends in the operational direction of said cleaning lever.

2. A cover glass cleaning mechanism for an optical scanning device as claimed in claim 1, wherein the stroke length of said cleaning lever is set to be longer than the length in the longitudinal direction of said cover glass.

3. A cover glass cleaning mechanism for an optical scanning device comprising: an optical system for optical scanning; an imaging surface; a cover glass for permitting the transmission of a scanning light beam from said optical system to said imaging surface; a mounting member to which said cover glass is mounted; and a cleaning lever which is provided at its end with a cleaning member for wiping the surface of said cover glass, wherein said cleaning lever is provided with a slot which is long in the longitudinal direction not to disturb the transmission of scanning beams even when said cleaning lever is fully retracted inside.

* * * * *